US012620709B2

(12) United States Patent
West et al.

(10) Patent No.: US 12,620,709 B2
(45) Date of Patent: May 5, 2026

(54) FULL-DUPLEX CIRCULAR PARASITIC ARRAY ASSEMBLY

(71) Applicant: Rockwell Collins, Inc., Cedar Rapids, IA (US)

(72) Inventors: James B. West, Cedar Rapids, IA (US); Zackery M. Hamilton, Cedar Rapids, IA (US); Jiwon L Moran, Marion, IA (US); James A. Stevens, Lucas, TX (US); Joseph T. Graf, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 130 days.

(21) Appl. No.: 18/223,883

(22) Filed: Jul. 19, 2023

(65) Prior Publication Data

US 2025/0030163 A1 Jan. 23, 2025

(51) Int. Cl.
*H01Q 5/378* (2015.01)
*H01Q 1/52* (2006.01)

(52) U.S. Cl.
CPC ............. *H01Q 5/378* (2015.01); *H01Q 1/521* (2013.01)

(58) Field of Classification Search
CPC ............................... H01Q 5/378; H01Q 1/521
See application file for complete search history.

(56) References Cited

U.S. PATENT DOCUMENTS 6,336,728 B1 1/2002 Peloy
6,419,372 B1 7/2002 Shaw et al.
6,574,030 B1 6/2003 Mosier
6,639,349 B1 10/2003 Bahadur
6,714,186 B1 3/2004 Mosier et al.
6,842,204 B1 1/2005 Johnson
6,972,729 B2 12/2005 Wang
7,025,474 B2 4/2006 Campbell et al.
7,036,946 B1 5/2006 Mosier
7,081,991 B2 7/2006 Jones et al.
7,481,954 B2 1/2009 Warren, Jr. et al.
8,089,579 B1 1/2012 Johnson et al.
8,604,987 B1 12/2013 Doane
8,641,219 B1 2/2014 Johnson et al.
(Continued)

FOREIGN PATENT DOCUMENTS

CN 105514584 A 4/2016
CN 119153926 A 12/2024
KR 20180090715 A 8/2018

OTHER PUBLICATIONS

European Patent Office, Extended European Search Report received in EP Application No. 24188418.8, Nov. 15, 2024, 9 pages.
(Continued)

*Primary Examiner* — Henry Luong
(74) *Attorney, Agent, or Firm* — Suiter Swantz IP

(57) ABSTRACT

A system may include a circular parasitic array (CPA) assembly including: a first CPA configured to at least one of transmit or receive; and a second CPA configured to at least one of transmit or receive; wherein the first CPA is configured to one of transmit or receive over a first bandwidth while the second CPA is configured to another of transmit or receive over the first bandwidth or a second bandwidth, wherein the first CPA and the second CPA are physically separated by a distance so as to provide on-frequency isolation.

20 Claims, 12 Drawing Sheets

(56) References Cited

U.S. PATENT DOCUMENTS

| | | | |
|---|---|---|---|
| 8,681,290 | B1 | 3/2014 | Hufnagel et al. |
| 8,830,132 | B1 | 9/2014 | Doane et al. |
| 8,842,055 | B2 | 9/2014 | Murdock et al. |
| 8,878,728 | B1 | 11/2014 | Livadaru et al. |
| 8,956,034 | B1 | 2/2015 | Johnson |
| 8,963,774 | B1 | 2/2015 | Livadaru et al. |
| 9,196,959 | B1 | 11/2015 | Doane et al. |
| 9,711,866 | B1 * | 7/2017 | Doane .................... H01Q 19/13 |
| 9,836,089 | B1 | 12/2017 | Covington et al. |
| 9,866,268 | B2 | 1/2018 | King et al. |
| 10,191,199 | B2 | 1/2019 | Nichol et al. |
| 10,212,752 | B1 | 2/2019 | Poduska et al. |
| 10,239,634 | B2 | 3/2019 | Johnson |
| 10,274,661 | B1 | 4/2019 | Johnson et al. |
| 10,573,217 | B2 | 2/2020 | Johnson |
| 10,598,848 | B2 | 3/2020 | Coleman et al. |
| 10,775,662 | B2 | 9/2020 | Johnson |
| 10,935,716 | B2 | 3/2021 | Nichol et al. |
| 10,996,511 | B1 | 5/2021 | Walker et al. |
| 11,102,860 | B2 | 8/2021 | Johnson |
| 11,256,025 | B2 | 2/2022 | Nichol et al. |
| 11,325,690 | B1 | 5/2022 | Graf et al. |
| 2016/0328065 | A1 | 11/2016 | Johnson et al. |
| 2018/0100945 | A1 | 4/2018 | Ewe et al. |
| 2021/0302780 | A1 | 9/2021 | Johnson et al. |
| 2022/0179148 | A1 | 6/2022 | Coleman et al. |
| 2022/0398987 | A1 | 12/2022 | Wyatt |
| 2023/0011530 | A1 | 1/2023 | Nichol et al. |
| 2025/0030164 | A1 | 1/2025 | Graf et al. |

OTHER PUBLICATIONS

European Patent Office, Extended European Search Report received in EP Application No. 24188462.6, Nov. 15, 2024, 9 pages.

Shibata et al., "Dual-band ESPAR antenna for wireless LAN applications," Antennas and Propagation Society Symposium, IEEE, vol. 2B, Jul. 3, 2005, 4 pages.

"Full Duplex Transmit/Receive"; https://web.archive.org/web/20221220090616/https://www.microwaves101.com/encyclopedias/full-duplex-transmit-receive; published Jun. 1, 2020.

https://web.archive.org/web/20220704191944/https://www.appliedavionics.com/pdf/MIL-STD-3009.pdf; Publication date: Feb. 2, 2001.

* cited by examiner

FULL-DUPLEX CIRCULAR PARASITIC ARRAY ASSEMBLY

BACKGROUND

The current Ku Band Common Data (CDL) Link definition specifies full-duplex (e.g., simultaneous transmit and receive) transceiver operation. Full-duplex operation traditionally has been a very difficult problem where the radiated transmitter power "stomps on" and desensitizes the receive (Rx) chain, which may leave the Rx chain inoperable, or may even damage delicate Ku band receiver circuitry. Traditional full-Duplex CDL systems utilize relatively physically large and expensive antenna and expensive high-performance duplexers to isolate the transceiver's Rx chain from the transmit (Tx) chain, which can require additional mechanical volume that can be problematic for highly miniaturized, size, weight, and, power, and cost (SWaP-C)-challenged airborne payload packages. Currently, high performance duplexers are required due to the close Rx-to-Tx frequency separation of Ku Band CDL system requirements. Currently, high performance duplexers add undesirable mechanical packaging weight and volume since they are high Q waveguide filters of high order (e.g., 9-10 filter poles) to meet stringent Rx-to-Tx isolation requirements for highly miniaturized, SWaP-C-challenged airborne payload packages.

Incumbent Ku Band CDL systems currently utilize heavy and expensive directional antennas that require direct current (DC) power-hungry two-axis mechanical positioning systems with complicated discovery and tracking algorithms; such incumbent Ku Band CDL systems are SWaP-C incompatible with small form factor unmanned aerial system (UAS) platforms. Incumbent directional Ku Band antenna systems are SWAP-C and aerodynamic-drag incompatible with small form factor UAS systems.

Directional communications in connected battle space typically have multi-frequency multi-function data link communications capabilities, such as used in air platforms (e.g., SWaP-C-limited attritable assets and future vertical lift (FVL) air platforms). A circular parasitic array (CPA) is an example of a very SWaP-C optimized and very low-cost active electronically steered antenna (AESA) that can provide reconfiguration of omni and directional fan beam direction modes with 360° azimuthal beam steering, such as by means of on/off switch (e.g., diodes) actuation to or from azimuthal directional beam scanning. Typically, a CPA's beam steering controller is much simpler than that of a planar two-dimensional (2D) AESA, which cannot produce 360° azimuthal beam coverage with a single planar 2D AESA panel. Currently, existing CPAs cannot enable multi-band communication where frequency bands are widely separated, such as a separation between C band and Ka band.

Currently, common-aperture full-duplex AESAs do not exist as common off the shelf (COTS) offerings.

SUMMARY

In one aspect, embodiments of the inventive concepts disclosed herein are directed to a system. The system may include a circular parasitic array (CPA) assembly including: a first CPA configured to at least one of transmit or receive; and a second CPA configured to at least one of transmit or receive; wherein the first CPA is configured to one of transmit or receive over a first bandwidth while the second CPA is configured to another of transmit or receive over the first bandwidth or a second bandwidth, wherein the first CPA and the second CPA are physically separated by a distance so as to provide on-frequency isolation.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
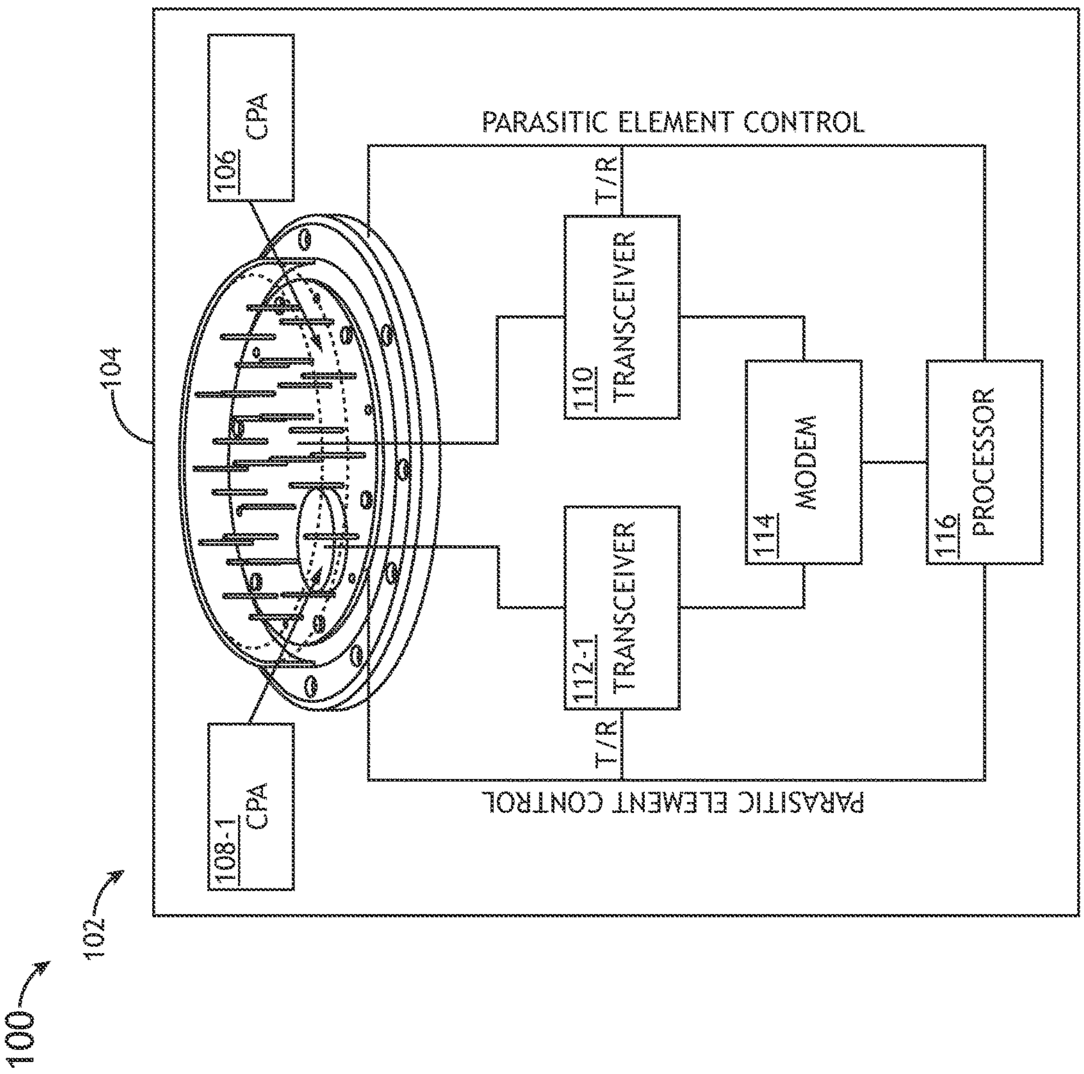
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including a circular parasitic array (CPA) assembly (e.g., a half-duplex or a full-duplex CPA assembly, such as a single-band or multiple band full-duplex CPA assembly). In some embodiments, the circular parasitic array (CPA) assembly may provide significant SWaP-C advantages over existing multiband and/or full-duplex solutions, such as for the C, Ka, and/or Ku bands, such as for ALE small UASs. Some embodiments may include a half-duplex CPA assembly, where only one of Rx or Tx is energized at any time instant; For example, Tx and Rx can be of the same of different frequency(ies). In some embodiments, full-duplex may refer to simultaneous Tx and Rx operation at a 100% duty cycle; for example, here Tx and Rx may be first order at a same frequency, and/or more practically, Tx and Rx may be extremely close in frequency such that $f_1$ (associated with Tx) may approximately equal $f_2$ (associated with Rx).

Some embodiments may include any of several approaches to CPA-based single-band and/or multi-band full-duplex data link operation, such as any of the following: (a) a receive (Rx) CPA (e.g., with a frequency $f_0=f_1$) and a transmit (Tx) CPA (e.g., with a frequency $f_0=f_2$) with free space antenna isolation by means of antenna-to-antenna physical separation; (b) Rx CPA (e.g., with a frequency $f_0=f_1$) and Tx CPA (e.g., with a frequency $f_0=f_2$) with compressed free space antenna isolation by means of antenna-to-antenna physical separation enhanced by using at least one high impedance surface (HIS) (HIS is also known as an electromagnetic band gap (EBG) surface; and/or (c) a multi-band full-duplex stacked CPA assembly having three or more CPAs, wherein the multi-band full-duplex stacked CPA assembly may have HIS surfaces between the three or more CPAs.

Some embodiments may greatly simplify or eliminate any needed duplexers required for full-duplex operation and to SWAP-C-optimized full-duplex antenna assemblies. For example, duplexers may be optional in full-duplex CPA assembly embodiments, or may be low-ordered duplexers, as opposed to currently used high-ordered duplexers. Lower order duplexers are typically much less expensive and smaller in size and volume.

Some embodiments may reduce an overall antenna volume for a full-duplex CPA assembly, as compared to current solutions.

Some embodiments may provide a long-felt, but unmet need for a SWaP-C full-duplex CPA assembly (e.g., a SWaP-C multi-band full-duplex CPA assembly).

Some embodiments may provide SWaP-C and aerodynamic-drag optimized full-duplex operation with a single antenna assembly that features reconfigurable (e.g., reprogrammable, such as via a field-programmable gate array (FPGA) controller) dual mode directional and/or omnidirectional reconfiguration with simple beam steering, target discovery, and/or target tracking. Some embodiments may provide multi-band full-duplex CPA operation simply that may be orders of magnitude less expensive than multiple planar AESAs currently required for 360° azimuthal coverage.

Some embodiments may be an antenna design configured to cut off and/or isolate higher frequency Tx from low frequency Rx.

Some embodiments may use a dual-linear and/or circularly-polarized antenna design so as to provide natural polarization diversity (e.g., cross-polarization isolation).

In some embodiments, CPA assembly may not be limited to full-duplex, but can also be configured as half-duplex CPA assembly.

In some embodiments, if the CPA assembly is full-duplex, the CPA assembly can have different theta and/or phi beam locations. For example, the CPA assembly can optionally use radiation pattern synthesis and/or nulling of Tx beam from Rx beam and/or can optionally use time such that the Rx is first at one point during a transmit/receive period (T) and Tx is offset by a delay within the period.

Some embodiments may include a method and a system including circular parasitic array assembly (e.g., a multiple-band circular parasitic array assembly). In some embodiments, the circular parasitic array assembly may include a first circular parasitic array and at least one positioned circular parasitic array. Each of the at least one positioned circular parasitic array may be positioned within the physical cylindrical volume of the first circular parasitic array and/or above the physical cylindrical volume of the first circular parasitic array.

Some embodiments may include a multiple (e.g., dual, triple, quadruple, quintuple, etc.) band integrated antenna structure (e.g., a circular parasitic array assembly) in which at least one high frequency (e.g., a Ku band and/or a Ka band) CPA is positioned within (e.g., embedded within) or above a low frequency (e.g., C band) CPA, which may keep overall antenna dimensions the same as the low frequency (e.g., C band) single CPA. In some embodiments, each of the multiple CPAs may be created using a conventional monolithic radiofrequency (RF) printed circuit board (PCB) process and integrated together. Equivalent functionality of such embodiments is not currently available in the market. Some embodiments, may include miniature, SWaP-C multiple-band circular parasitic array assembly having omnidirectional and/or directional modality with very simple beam steering control.

Some embodiments may include creating a multiple frequency integrated antenna structure in which a higher frequency (e.g., Ku Band and/or a Ka band) CPA is embedded within a lower frequency (e.g., a C Band) CPA to keep overall antenna dimensions the same as the single lower frequency (e.g., C Band) CPA. In some embodiments, each CPA may be created using a conventional radiofrequency (RF) printed circuit board (PCB) process and integrated together.

Some embodiments may provide multiple band CPA operation simply and inexpensively, for example, that enables multi-band datal link dual mode omni and/or directional operation that is orders of magnitude less expensive than current AESAs required for 360° azimuthal coverage.

Some embodiments provide an assembly including multiple band CPA assembly having a common assembly while minimally perturbing each of the CPAs of the assembly.

In some embodiments, multiple modes of operations are available for a CPA assembly, such as any of the following: passive omnidirectional C-band, active directional Ku-band; Active directional C-band, passive omnidirectional Ku-band; and/or Active directional C-band and active directional Ku-band.

In some embodiments, symmetric shunt loading due to a Ku ground plane can help optimize instantaneous bandwidth of a C-band CPA.

In some embodiments, a CPA assembly may include two Ku-band antennas at omnidirectional mode within less than 1 lambda so as to increase antenna gain.

Some embodiments provide a small form factor with low aerodynamic drag antenna subsystems to enable extreme SWaP-C multiple band frequency operation for directional communications. Some embodiments may provide a solution for a Ku-band antenna that meets needs of ALE Small as, currently, no commercially available technology meets required SWAP.

Referring now to FIGS. 1-4, an exemplary embodiment of a system 100 according to the inventive concepts disclosed herein are depicted. The system 100 may be implemented as any suitable system. In some embodiments, the system 100 may include a vehicle (e.g., an aircraft 102 (e.g., a piloted aircraft, an unmanned aerial system (e.g., an Air Launched Effect(s) (ALE) and/or a remote-piloted aircraft)), an automobile, a spacecraft, or a watercraft). For example, Air Launched Effects (ALE) are a Family of Systems (FoS) may include an air vehicle, payload(s), mission system applications, and associated support equipment designed to autonomously or semi-autonomously deliver effects as a single agent or as a member of a team. For example, as shown in FIG. 1, the system 100 may include a circular parasitic array assembly 104. In some embodiments, the circular parasitic array assembly 104 may be installed on the vehicle or at any of suitable stationary or mobile locations.

Figure 2A:
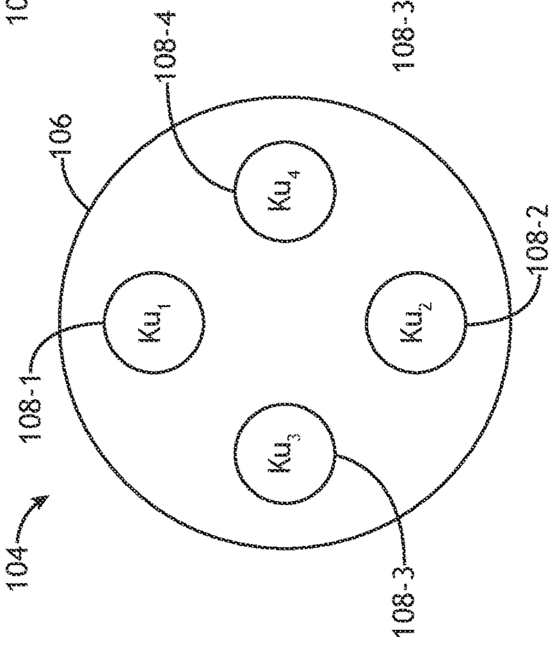
FIGS. 2A, 2B, and 2C are views of exemplary embodiments of the circular parasitic array assembly of the system of FIG. 1 according to the inventive concepts disclosed herein.
Figure 2B:
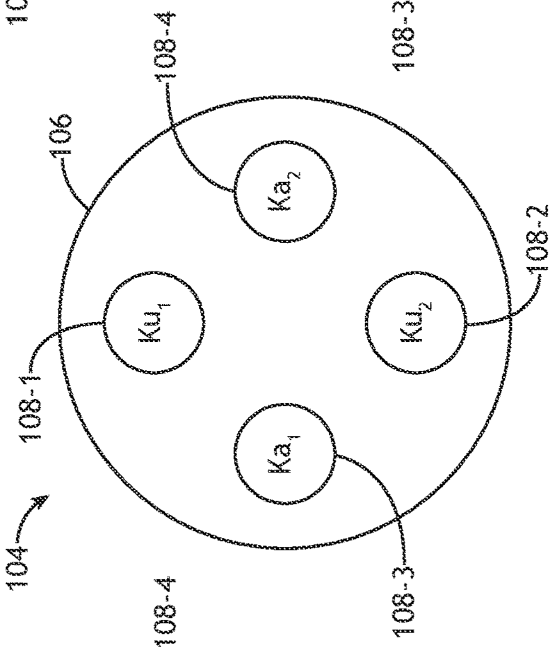
Figure 2C:
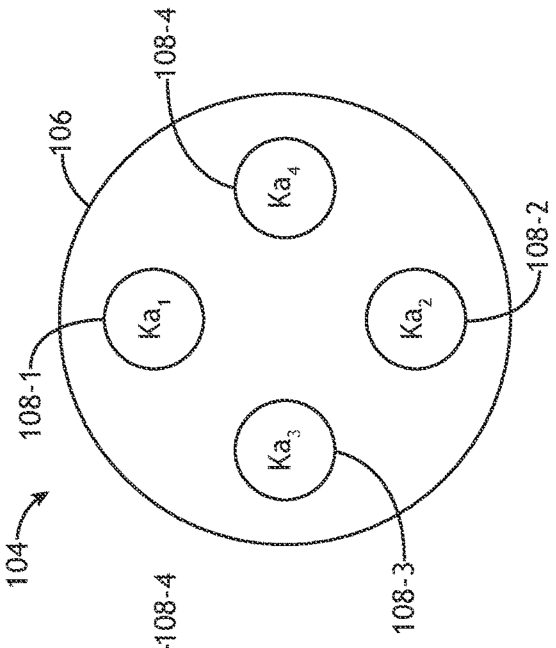

In some embodiments, the circular parasitic array assembly 104 may include a first circular parasitic array 106, at least one positioned circular parasitic array (e.g., a first positioned circular parasitic array 108-1, a second positioned circular parasitic array 108-2, a third positioned circular parasitic array 108-3, and/or a fourth positioned circular parasitic array 108-4 (as shown in FIGS. 2A-2C)), a first transceiver 110, at least one other transceiver (e.g., 112-1; e.g., each of which may be associated with one of the at least one positioned circular parasitic array (e.g., 108-1, 108-2, 108-3, 108-4)), at least one modem 114, and/or at least one processor 116 (e.g., at least one beam controller (e.g., one joint beam controller or a beam controller for each of the circular parasitic array 106 and the at least one positioned circular parasitic array (e.g., 108-1, 108-2, 108-3, 108-4)), some or all of which may be communicatively coupled (e.g., electrically coupled) at any given time. In some embodiments, the at least one processor 116 may be located on another device, which may be communicatively coupled to the circular parasitic array assembly 104.

Figure 3A:
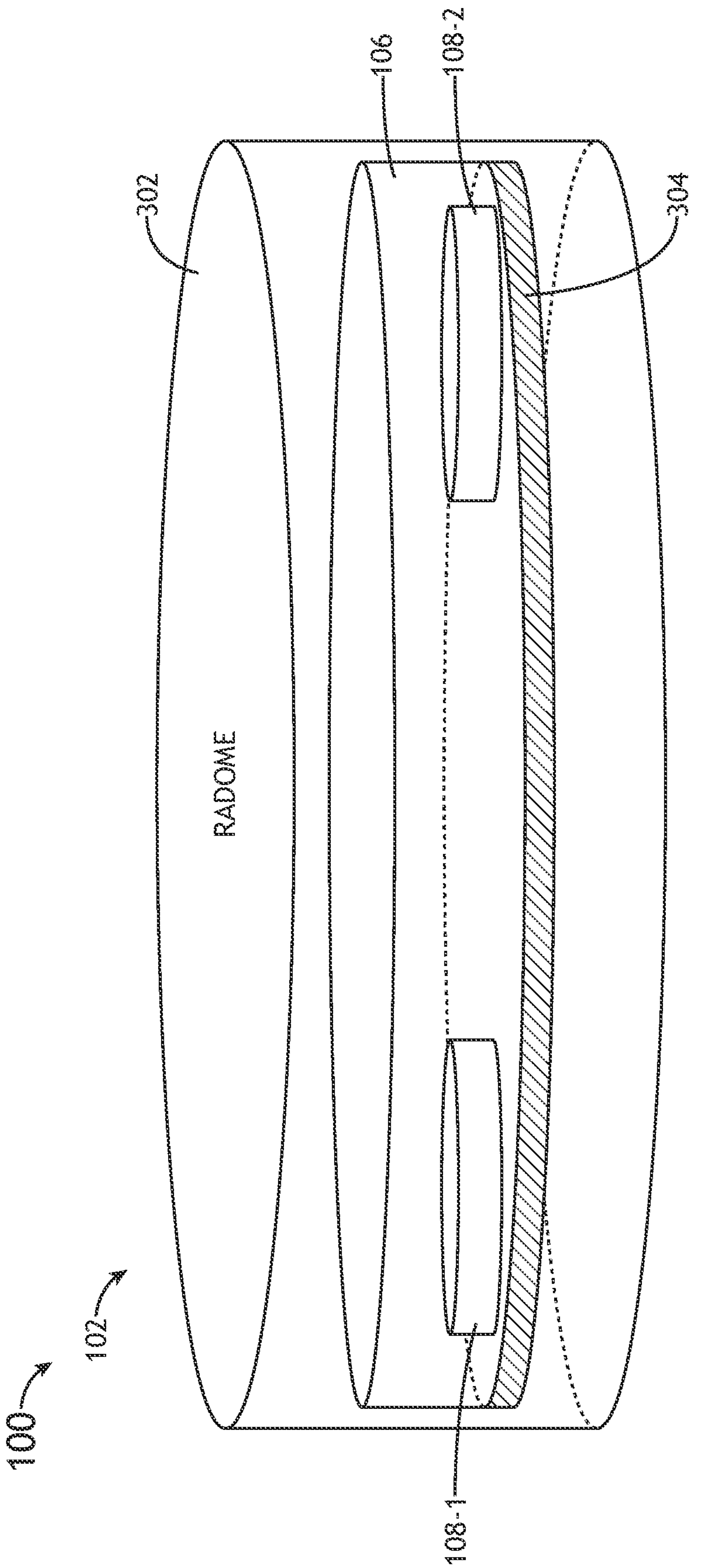
FIGS. 3A and 3B include views of exemplary embodiments of the circular parasitic array assembly of the system of FIG. 1 according to the inventive concepts disclosed herein.
Figure 3B:
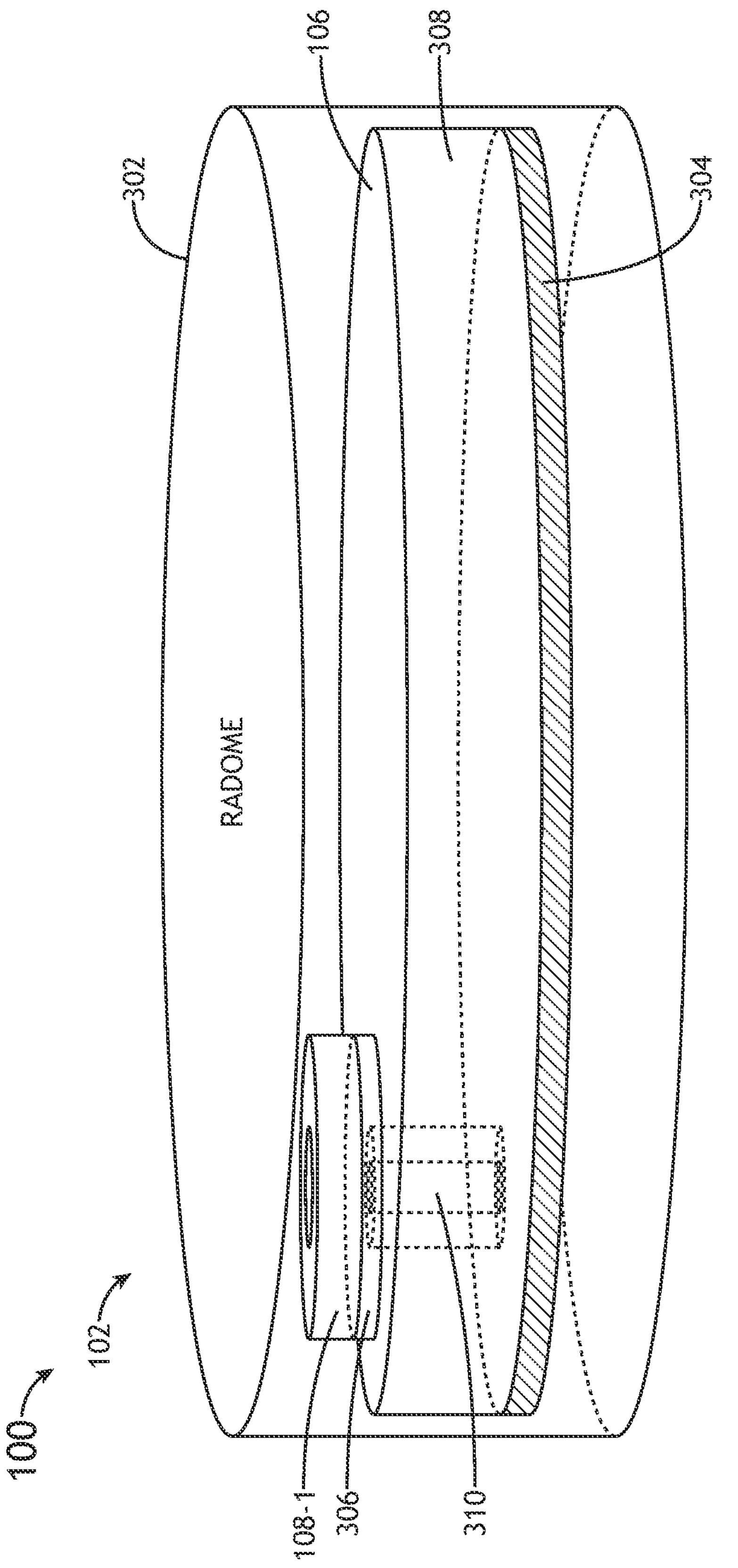

The first circular parasitic array 106 may be any suitable type of circular parasitic array 106. For example, the first circular parasitic array 106 may include monopoles (e.g., center driven monopole 402 and/or switched monopoles 404), a dielectric substrate 308, and/or a printed circuit board (PCB) 304 (as shown in FIG. 3A-B) (e.g., which may have a ground plane). For example, the first circular parasitic array 106 may be configured to at least one of transmit or receive over a first bandwidth (e.g., any suitable bandwidth; e.g., which may be a higher frequency bandwidth than a bandwidth of each of the at least one positioned circular parasitic array (e.g., 108-1, 108-2, 108-3, 108-4)). The first circular parasitic array 106 may be defined by a physical cylindrical volume, which for example, may enclose (e.g., enclose and abut at least some of the following) the monopoles (e.g., 402 and/or 404), the dielectric substrate 308, and/or the PCB 304.

Each of the at least one positioned circular parasitic array (e.g., a first positioned circular parasitic array 108-1, a second positioned circular parasitic array 108-2, a third positioned circular parasitic array 108-3, and/or a fourth positioned circular parasitic array 108-4 (as shown in FIGS. 2A-2C)) may be any suitable type of circular parasitic array 106. For example, each of the at least one positioned circular parasitic array (e.g., 108-1, 108-2, 108-3, and/or 108-4) may include monopoles (e.g., a center driven monopole and/or switched monopoles), a dielectric substrate, and/or a PCB 306 (as shown in FIG. 3B) (e.g., which may have a ground plane), any or all of which may be similar and function similar to those of the first circular parasitic array 106 except that the components of each of the at least one positioned circular parasitic array (e.g., 108-1, 108-2, 108-3, and/or 108-4) may be smaller than those components of the first circular parasitic array 106. Each of the at least one positioned circular parasitic array (e.g., 108-1, 108-2, 108-3, and/or 108-4) may be positioned within the physical cylindrical volume of the first circular parasitic array 106 and/or above the physical cylindrical volume of the first circular parasitic array 106. Each of the at least one positioned circular parasitic array may be configured to transmit and/or receive over a given bandwidth (e.g., any suitable bandwidth, which may be the same or different for each of the at least one positioned circular parasitic array), wherein the given bandwidth is a higher frequency bandwidth than the first bandwidth of the first circular parasitic array 106.

In some embodiments, the first transceiver 110 may be at least connected to the first circular parasitic array 106. Each of the at least one other transceiver (e.g., 112-1) may be at least connected to one of the at least one positioned circular parasitic array (e.g., 108-1, 108-2, 108-3, 108-4). The modem 114 may be at least connected to each of the first transceiver 110 and the at least one other transceiver (e.g., 112-1). The at least one processor 116 may be at least connected to the modem 114 and/or a radio 118. The circular parasitic array assembly 104 may have parasitic element control for each of the first circular parasitic array 106 and the at least one positioned circular parasitic array (e.g., 108-1, 108-2, 108-3, 108-4). In some embodiments, each CPA (e.g., 106, 108-1, 108-2, 108-3, and/or 108-4) can have its own relatively simple processor (e.g., 116; e.g., a microcontroller) integrated into the CPA assembly 104, such as via pass-through control. In some embodiments, the CPA assembly 104 may include a processor 116, which may function as a master controller (e.g., which may be a field-programmable gate array (FPGA)), that can pipe command signals at the transceiver/modem level to all of the CPAs (e.g., 106, 108-1, 108-2, 108-3, and/or 108-4).

In some embodiments, the at least one processor 116 may include any number and/or type(s) of processor. In some embodiments, one or more of the at least one processor 116 may have software-defined radio (SDR) functionality and/or non-SDR functionality. For example, the at least one processor 116 may be configured as a common dual or multiple band beam steering controller that can interface to each CPA 106, 108-1, 108-2, 108-3, and/or 108-4 of the circular parasitic array assembly 104. For example, the at least one processor 116 may be and/or may include at least one beam controller, at least one radiofrequency (RF) processor, at least one RF system on chip (SOC), at least one general purpose processor (e.g., at least one central processing unit (CPU)), at least one digital signal processor (DSP), at least one application specific integrated circuit (ASIC), and/or at least one field-programmable gate array (FPGA). The at least one processor 116 may be configured to perform (e.g., collectively perform if more than one processor) any or all of the operations disclosed throughout. The at least one processor 116 may be configured to run various software and/or firmware applications and/or computer code stored (e.g., maintained) in a non-transitory computer-readable medium (e.g., memory) and configured to execute various instructions or operations. In some embodiments, the at least one processor 116 may be communicatively coupled to various elements of the circular parasitic array assembly 104.

Referring to FIGS. 2A, 2B, and 2C, exemplary embodiments of the circular parasitic array assembly 104 are shown, according to the inventive concepts disclosed herein are depicted.

As shown, in FIG. 2A, the first circular parasitic array 106 may be configured to transmit and/or receive in a C band; a first positioned circular parasitic array 108-1 may be configured to transmit and/or receive in a first Ku band; a second positioned circular parasitic array 108-2 may be configured to transmit and/or receive in a second Ku band; a third positioned circular parasitic array 108-3 may be configured to transmit and/or receive in a third Ku band; and/or a fourth positioned circular parasitic array 108-4 may be configured to transmit and/or receive in a fourth Ku band, wherein the first, second, third, and fourth Ku bands may be the same or different.

As shown, in FIG. 2B, the first circular parasitic array 106 may be configured to transmit and/or receive in a C band; a first positioned circular parasitic array 108-1 may be configured to transmit and/or receive in a first Ku band; a second positioned circular parasitic array 108-2 may be configured to transmit and/or receive in a second Ku band; a third positioned circular parasitic array 108-3 may be configured to transmit and/or receive in a first Ka band; and/or a fourth positioned circular parasitic array 108-4 may be configured to transmit and/or receive in a second Ka band.

As shown, in FIG. 2C, the first circular parasitic array 106 may be configured to transmit and/or receive in a C band; a first positioned circular parasitic array 108-1 may be configured to transmit and/or receive in a first Ka band; a second positioned circular parasitic array 108-2 may be configured to transmit and/or receive in a second Ka band; a third positioned circular parasitic array 108-3 may be configured to transmit and/or receive in a third Ka band; and/or a fourth positioned circular parasitic array 108-4 may be configured to transmit and/or receive in a fourth Ka band, wherein the first, second, third, and fourth Ka bands may be the same or different.

As shown in FIGS. 2A-C, in some embodiments, multiple Ku and/or Ka band CPAs (e.g., 108-1, 108-2, 108-3, and/or 108-4) can reside in the CPA assembly 104 to: enhance Ku and/or Ka Band system capability; symmetrically perturb a C Band CPA (e.g., 106) to improve performance in the presence of the Ku and/or Ka Band CPAs (e.g., 108-1, 108-2, 108-3, and/or 108-4). In some embodiments, the CPA assembly 104 may be a dual band, a triple band, quadruple band system, or a quintuple band CPA assembly. In some embodiments, a symmetric (e.g., radially symmetric) layout of the higher frequency CPAs (e.g., 108-1, 108-2, 108-3, and/or 108-4) may create less perturbation to the lower frequency CPA (e.g., 106). In some embodiments, the added number of higher frequency CPAs may enhance overall data link system functionality.

Referring to FIGS. 3A and 3B, exemplary embodiments of the circular parasitic array assembly 104 are shown, according to the inventive concepts disclosed herein are depicted. In some embodiments, the circular parasitic array assembly 104 may be covered by a radome 302.

As shown in FIG. 3A, one or more of the at least one positioned circular parasitic array (e.g., 108-1, 108-2, 108-3, and/or 108-4) may be positioned (e.g., embedded) within the physical cylindrical volume of the first circular parasitic array 106. The first and second positioned circular parasitic arrays 108-1, 108-2 may each comprise a PCB 306 (e.g., as illustrated in FIG. 3B). The first circular parasitic array 106 may comprise a ground plane having a first void, wherein the PCB 306 of the first positioned circular parasitic array 108-1 may be positioned (e.g., mechanically attached) within the first void of the ground plane. The first circular parasitic array 106 may comprise the ground plane also having a second void, wherein the PCB 306 of the second positioned circular parasitic array 108-2 may be positioned within the second void of the ground plane.

In some embodiments, for example, C Band reflector/director monopoles (e.g., 404) may be removed under a perimeter (and area within the perimeter) of the Ku Band CPA. In some embodiments, four Ku Band CPAs arranged in north/south/east/west symmetry arrangement may have acceptable C Band perturbation.

As shown in FIG. 3B, one or more of the at least one positioned circular parasitic array (e.g., 108-1, 108-2, 108-3, and/or 108-4) may be positioned within the physical cylindrical volume of the first circular parasitic array 106 and/or above (e.g., partially above or directly above) the physical cylindrical volume of the first circular parasitic array 106. The first positioned circular parasitic arrays 108-1 may each comprise a PCB 306. The first circular parasitic array 106 may comprise a dielectric substrate positioned above first circular parasitic array's 106 PCB 304. In some embodiments, one or more of the at least one positioned circular parasitic array (e.g., 108-1, 108-2, 108-3, and/or 108-4) may be positioned above the dielectric substrate 308. In some embodiments, one or more of the at least one positioned circular parasitic array (e.g., 108-1, 108-2, 108-3, and/or 108-4) may have a separate feed line 310 (e.g., coax feed line, such as a micro-coax feed line). For example, such an exemplary embodiment disclosed in FIG. 3B may minimize undesirable CPA-(e.g., 106) to-CPA (e.g., 108-1) RF interactions. In some embodiments, a Ku Band CPA (e.g., 108-1) may be fed with small form factor micro-coax to minimize C Band CPA perturbation.

In some embodiments, the C Band CPA reflector/director monopoles (e.g., 404) may reside under the Ku CPA (e.g., 108-1). The Ku Band CPA may be above the C Band CPA within close vicinity. The C Band reflectors/director monopole lengths in the vicinity of the Ku CPA may be foreshortened to account for parasitic effects.

In some embodiments, the Ku band CPA of the CPA assembly 104 may be reinforced by including structural foam inside the radome 302, the radome 302 being mechanically designed to be a "receptacle" for the Ku CPA, and/or the Ku Band CPA may have a "from the top" feed line 310 drop in assembly.

Referring still to FIG. 3B, some embodiments may include symmetric shunt loading of the monopole elements. For example, a Ku Band CPA's ground bottom side may act as a capacitive top-hat load of a monopole and should drive resonant frequencies of the C Band pins directly under to be down in frequency. In some embodiments, this effect may be compensated for by fore shortening those C Band monopoles directly under the Ku Band ground.

Referring still to FIG. 3B, in some embodiments, the Ku Band beam controller may be located on a bottom side of the Ku Band RF ground. Some embodiments may include electromagnetic interference (EMI) shielding to minimize Ku/C Band interaction.

Figure 4:
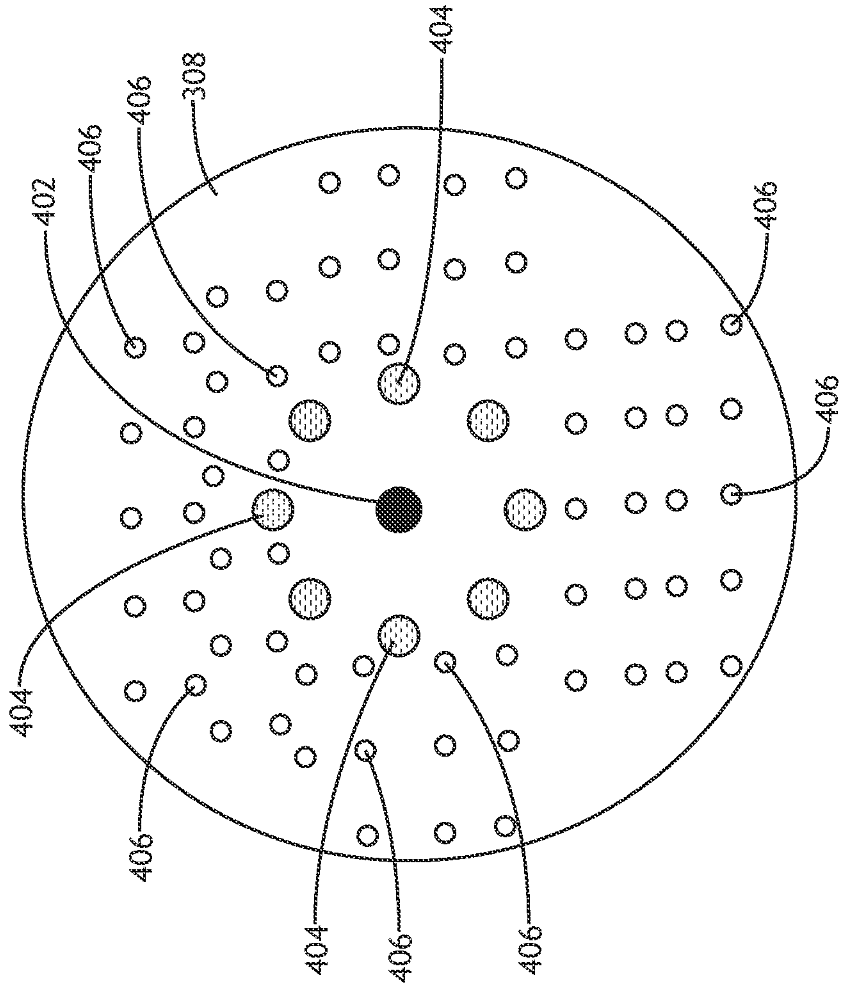
FIG. 4 is view of exemplary embodiment of a first circular parasitic array of the circular parasitic array assembly of the system of FIG. 1 according to the inventive concepts disclosed herein.

Referring now to FIG. 4, an exemplary embodiment of the first circular parasitic array 106 of the circular parasitic array assembly 104 is shown, according to the inventive concepts disclosed herein are depicted.

As shown in FIG. 4, the first circular parasitic array 106 may include a dielectric substrate 308 having an array of holes 406. The first circular parasitic array 106 may include a center, driven monopole 402 and a plurality of switched monopoles 404 (which may also be referred to director monopoles (for the off state) or reflector monopoles for the on state).

Generally, antenna performance favors construction with low loss dielectric materials. Currently, COTS dielectric substrate materials used on antenna constructions vary between a dielectric constant ($d_k$)=2.1 to $d_k$=38. Typically, the higher the dielectric constant, there is electrically smaller the antenna structure as a function of wavelength. Typically, dielectric loading of an antenna creates two very undesirable effects: the unloaded Q of the antenna raise, which lower the impedance bandwidth, which may be a significant effect for some antenna architectures; and input terminals' self-impedance match of the antenna may worsen, and in many cases, cannot be adequately compensated for by a conventional reactive impedance matching network. For some embodiments, CPA antenna design may result from a complex interaction between the center driven monopole, the "off state" director monopoles and the on-state "reflector" monopoles, monopole height, and the dielectric constant surrounding the monopoles. In general, lowering the dielectric constant of the CPA antenna raises its resonant frequency and can also improve radiation and impedance performance of the antenna. In some embodiments, the dielectric constant can be adjusted by using a design with a grid of holes 406 (e.g., "air" holes) within a dielectric substrate 308 to lower its overall dielectric constant $d_k$. In some embodiments, the dielectric constant of the substrate can be tailored by additive manufacturing techniques, such as by varying a dielectric ratio and/or air density ratio during a fabrication process, (e.g., by additively manufacturing a "porous" dielectric region).

As shown in FIG. 4, the depiction of the first circular parasitic array 106 has been simplified for illustrative purposes. For example, the first circular parasitic array 106 may include multiple rings of switched monopoles 404. In some embodiments, some or all of the monopoles 402, 404 can be either outside the holes 406, as shown in FIG. 4, or inside some or all of the holes 406. In some embodiments, the diameters, spacing, and/or number of holes 406 may affect the amount of dielectric const lowering. In some embodiments, the holes 406 may be blind via holes produced by a PCB process and/or through-holes between monopole elements (e.g., the dielectric substrate 308 can have through holes that are machined and bonded to the lower monopole PCB metallic substrate surface).

Referring generally to FIGS. 1-4, in some embodiments, a system may include a circular parasitic array assembly 104, which may include a first circular parasitic array 106 and at least one positioned circular parasitic array (e.g., 108-1, 108-2, 108-3, and/or 108-4). The first circular parasitic array 106 may be configured to at least one of transmit or receive over a first bandwidth. The first circular parasitic array 106 may be defined by a physical cylindrical volume. The at least one positioned circular parasitic array (e.g., 108-1, 108-2, 108-3, and/or 108-4) may include a first positioned circular parasitic array 108-1. The first positioned circular parasitic array 108-1 may be configured to at least one of transmit or receive over a second bandwidth, the second bandwidth being a higher frequency bandwidth than the first bandwidth.

In some embodiments, the at least one positioned circular parasitic array further includes a second positioned circular parasitic array 108-2, which may be configured to at least one of transmit or receive over a third bandwidth (e.g., which may be the same or different than the second bandwidth), the third bandwidth being a higher frequency bandwidth than the first bandwidth. For example, the first bandwidth may be in a C band, and the second bandwidth may be in a Ku band or a Ka band. In some embodiments, the at least one positioned circular parasitic array further includes a third positioned circular parasitic array 108-3 configured to at least one of transmit or receive over a fourth bandwidth (e.g., which may be the same and/or different than the second bandwidth and/or the third bandwidth), the fourth bandwidth being a higher frequency bandwidth than the first bandwidth. For example, the first, second, and third positioned circular parasitic arrays 108-1, 108-2, 108-3 may be radially symmetrically arranged around a center monopole 402 of the first circular parasitic array 106, for example, so as to symmetrically perturb the first circular parasitic array 106. For example, the first bandwidth may be in a C band, the second bandwidth may be in a first Ku band, the third bandwidth may be in a second Ku band, and the fourth bandwidth may be in a Ka band. In some embodiments, the at least one positioned circular parasitic array further includes a fourth positioned circular parasitic array 108-4, which may be configured to at least one of transmit or receive over a fifth bandwidth (e.g., which may be the same and/or different than the second bandwidth and/or the third bandwidth), the fifth bandwidth being a higher frequency bandwidth than the first bandwidth.

In some embodiments, each of the first circular parasitic array 106 and the at least one positioned circular parasitic array (e.g., 108-1, 108-2, 108-3, and/or 108-4) has a separate radiofrequency (RF) feed and separate beam switching control signal.

In some embodiments, the system may include at least one processor 120, which may be configured to operate the first circular parasitic array 106 and the at least one positioned circular parasitic array of the circular parasitic array assembly 104.

In some embodiments, each of the at least one positioned circular parasitic array (e.g., 108-1, 108-2, 108-3, and/or 108-4) and the first circular parasitic array 106 may operate as a fixed mode passive antenna in at least one of an omnidirectional mode or a directional mode.

In some embodiments, at any given time, each of the at least one positioned circular parasitic array (e.g., 108-1, 108-2, 108-3, and/or 108-4) and the first circular parasitic array 106 may operate as an active mode antenna in at least one of an omnidirectional mode or a directional mode.

In some embodiments, at any given time, each of one or more of the at least one positioned circular parasitic array (e.g., 108-1, 108-2, 108-3, and/or 108-4) and the first circular parasitic array 106 may operate as a fixed mode passive antenna in at least one of an omnidirectional mode or a directional mode, and, at any given time (e.g., at least one another given time), each of at least one other of the at least one positioned circular parasitic array (e.g., 108-1, 108-2, 108-3, and/or 108-4) and the first circular parasitic array 106 may operate as an active mode antenna in at least one of an omnidirectional mode or a directional mode.

For example, one or more of the at least one positioned circular parasitic array (e.g., 108-1, 108-2, 108-3, and/or 108-4) and the first circular parasitic array 106 may operate in any of the following modes: omnidirectional (Omni) C Band+Omni Ku Band; Omni C Band+Active dual mode Ku Band; Active Dual-mode C Band+passive Ku omni; orActive Dual-mode C Band+Active Dual mode Ku omni. Similar permutations of dual band, tri-band, quad band, or quintuple band CPA assemblies 104 may be extrapolated, such as for C+Ku1+Ku2+Ka1+Ka2 Band integrated CPA assemblies.

In some embodiments, simultaneous dual C Band/Ku Band receive and transmit may be enabled, for example, due to a relatively narrow band of each antenna along with the wide frequency separation of the Ku to C Band. In some embodiments, at any given time, the first circular parasitic array 106 may be configured to one of transmit or receive while one or more of the at least one positioned circular parasitic array (e.g., 108-1, 108-2, 108-3, and/or 108-4) are configured to another of transmit or receive. In some embodiments, at any given time, the first circular parasitic array 106 may be configured to transmit while one or more of the at least one positioned circular parasitic array (e.g., 108-1, 108-2, 108-3, and/or 108-4) are configured to transmit. In some embodiments, at any given time, the first circular parasitic array 106 may be configured to receive while one or more of the at least one positioned circular parasitic array (e.g., 108-1, 108-2, 108-3, and/or 108-4) are configured to receive.

In some embodiments, the first circular parasitic array 106 may comprise a dielectric substrate 308 having an array of holes 406, wherein the array of holes may lower a dielectric constant of the dielectric substrate 308 as compared to another dielectric substrate lacking said array of holes 406.

In some embodiments, one or more of the at least one positioned circular parasitic array (e.g., 108-1, 108-2, 108-3, and/or 108-4) may be positioned above the first circular parasitic array 106, and/or the one or more of the at least one positioned circular parasitic array (e.g., 108-1, 108-2, 108-3, and/or 108-4) may be off-centered relative to a center monopole 402 of the first circular parasitic array 106.

In some embodiments, the circular parasitic array assembly 104 may have symmetric shunt loading.

Figure 5:
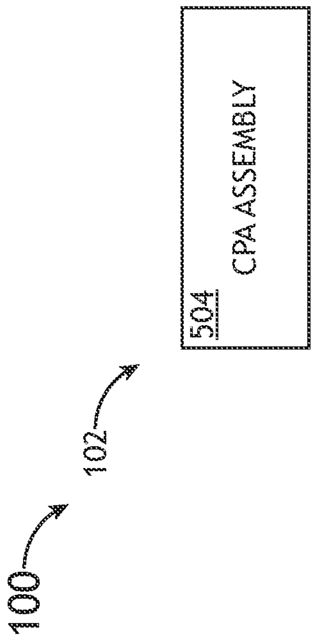
FIG. 5 is a view of an exemplary embodiment of a system according to the inventive concepts disclosed herein.

Referring generally now to FIGS. 5-9B, exemplary embodiments of a system 100 according to the inventive concepts disclosed herein are depicted. The system 100 may be implemented as any suitable system. In some embodiments, the system 100 may include a vehicle (e.g., an aircraft 102 (e.g., a piloted aircraft, an unmanned aerial system (e.g., an (ALE) and/or a remote-piloted aircraft)), a terrestrial vehicle (e.g., an automobile (e.g., a military truck) or a tank), a spacecraft, or a watercraft). For example, as shown in FIG. 5, the system 100 may include a full-duplex CPA assembly 504 In some embodiments, the full-duplex CPA assembly 504 may be installed on the vehicle or at any of suitable stationary or mobile locations.

In some embodiments, the full-duplex CPA assembly 504 may include at least two CPAs (e.g., a first CPA 505-1, a second CPA 505-2, a third CPA 505-3, a fourth CPA 505-4, and/or etc.), at least one processor 116 (e.g., as shown and described with respect to FIGS. 1-4; e.g., at least one system controller, at least one beam controller 116, and/or at least one controller having functionality of a system and beam controller; e.g., a processor, such as a general-purpose processor, an application specific integrated circuit (ASIC), or a field-programmable gate array (FPGA)) that can pipe command signals at the transceiver/modem level to all of the CPAs (e.g., 505-1, 505-2, 505-3, and/or 505-4), at least one modem 114, at least one transceiver 112, at least one Rx chain 508, at least one Tx chain 510, at least one optional duplexer 512 (e.g., a low-order duplexer, such as a first, second, third, fourth, or fifth order duplexer; as compared to the high order duplexers (e.g., as high as ninth or tenth order, or higher) of current solutions), at least one HIS 702 and/or at least one HIS surface 802, some or all of which may be communicatively coupled (e.g., electrically coupled) at any given time. For example, the first CPA 505-1 may be configured to at least one of transmit or receive over a first bandwidth (e.g., which may be any suitable bandwidth, such as in the Ku, Ka, or C band). For example, the second CPA 505-2 may be configured to at least one of transmit or receive over the first bandwidth. In some embodiments, the first CPA 505-1 may be configured to one of transmit or receive over the first bandwidth while (e.g., exactly simultaneously or with offset transmit and receive periods (T)) the second CPA 505-2 is configured to another of transmit or receive over the first bandwidth. In some embodiments, the first CPA 505-1 and the second CPA 505-2 may be physically separated by a distance (e.g., a horizontal or vertical distance) so as to provide on-frequency isolation (e.g., isolation in dB where the Rx frequency and the Tx frequency is close in frequency (e.g., within 100s of kHz). In some embodiments, the modem 114, the transceiver 112, and/or the at least one processor 116 may be located on another device (e.g., a radio), which may be communicatively coupled to the circular parasitic array assembly 504.

In some embodiments each of the at least two CPAs may include monopoles (e.g., 402 and/or 404, as discussed above), dielectric substrate 308 (e.g., as discussed above), and/or a PCB 304 (as discussed above; e.g., which may have a ground plane (e.g., which may have an HIS, which may attenuate surface current(s) so as to provide further RF isolation between two RF devices)).

In some embodiments, the first CPA 505-1 may be configured to at least one of transmit or receive over a first frequency within the first bandwidth; the second CPA 505-2 may be configured to at least one of transmit or receive over a second frequency within the first bandwidth; and the first CPA 505-1 may be configured to one of transmit or receive over the first frequency within the first bandwidth while the second CPA 505-2 is configured to another of transmit or receive over the second frequency within the first bandwidth; for example, the operation frequencies for CPAs 505-1 and 505-2 may typically be extremely close together (e.g., within 100s of kHz) in full-duplex systems.

In some embodiments, the full-duplex CPA assembly 504 may be configured to use a Ku, Ka, and/or C Band Common Data Link (CDL) protocol.

Figure 6:
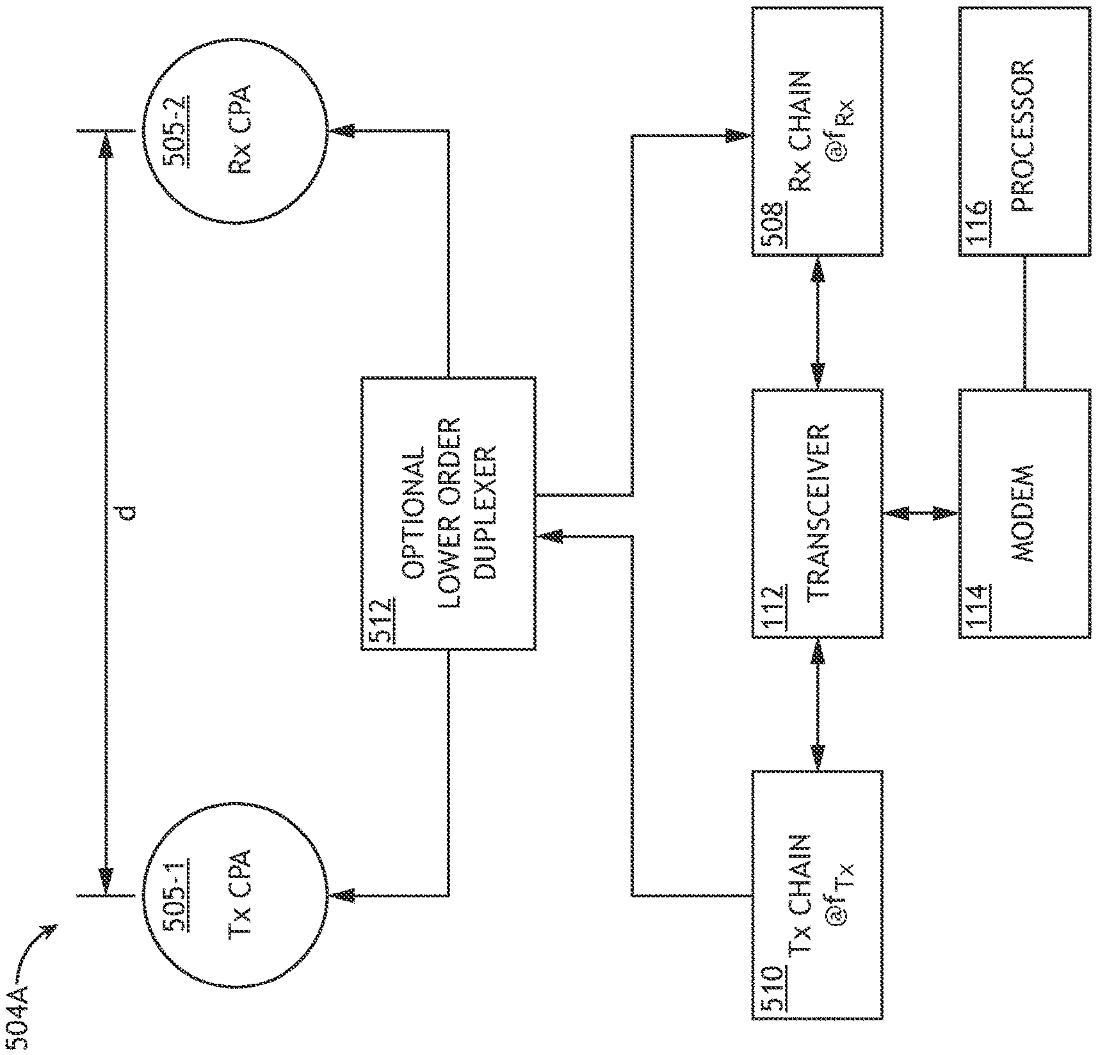
FIGS. 6, 7A, 7B, 8A, and 8B are views of exemplary embodiments of the circular parasitic array assembly of the system of FIG. 5 according to the inventive concepts disclosed herein.
Figure 7A:
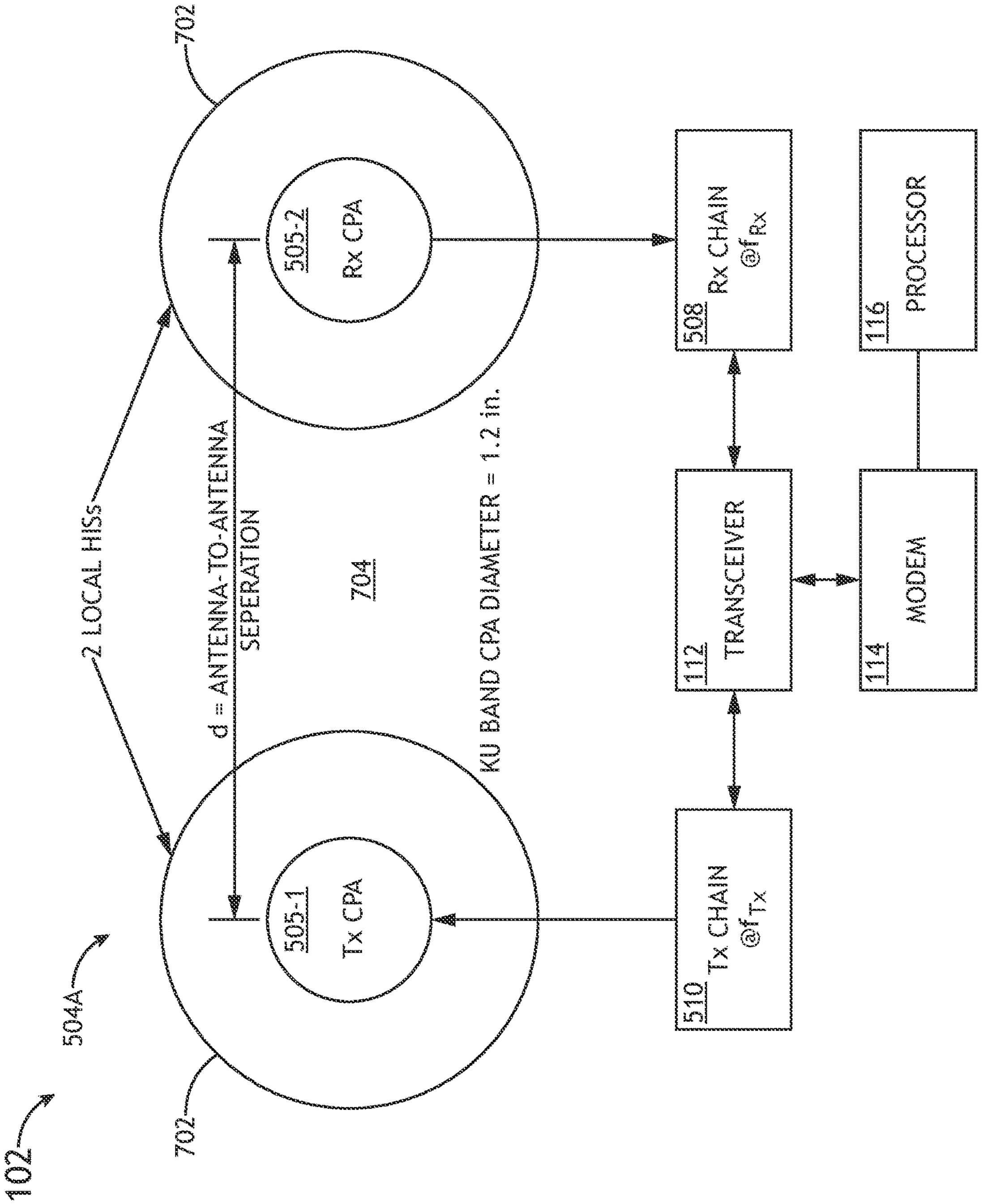
Figure 7B:
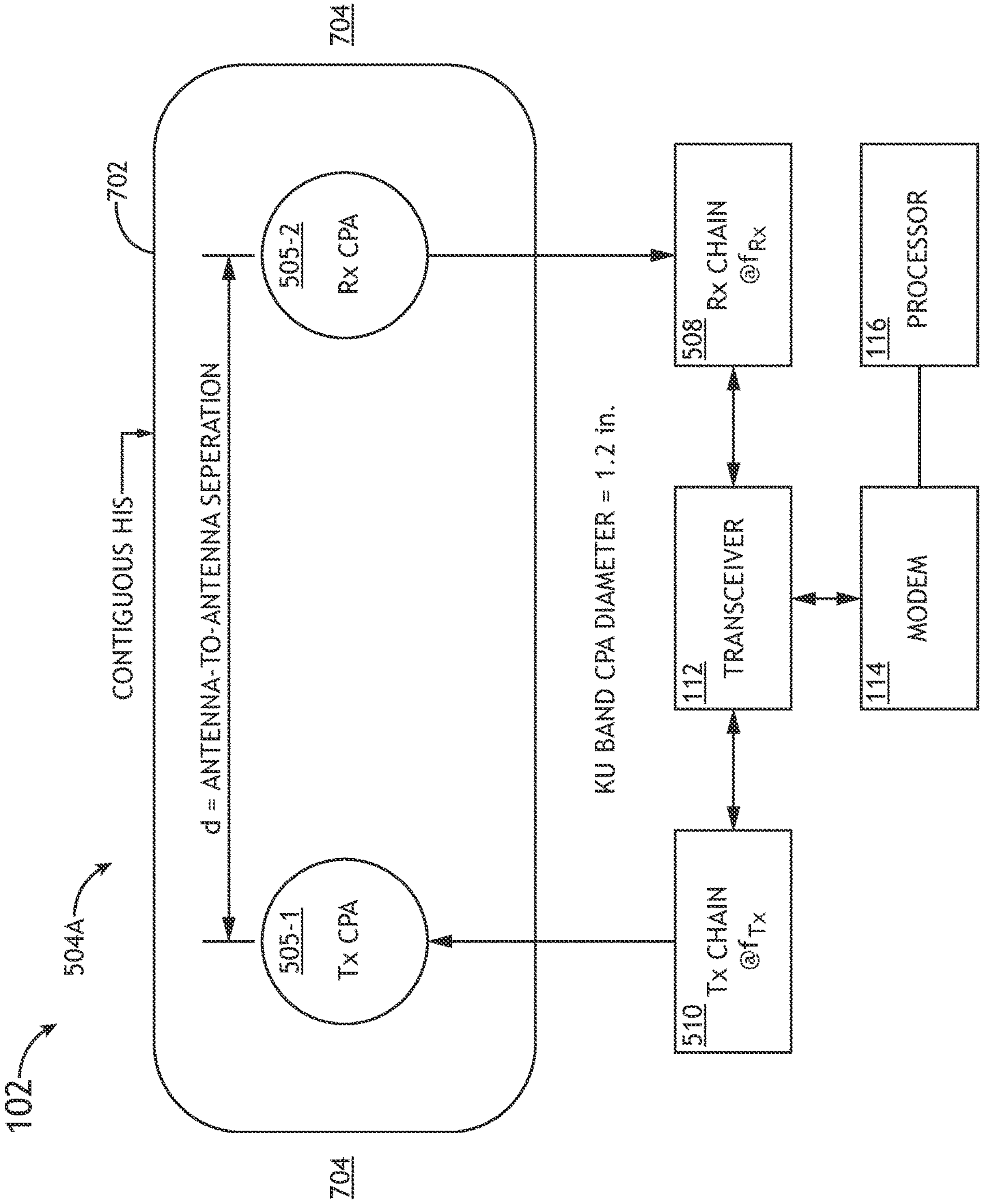

Referring to FIGS. 6, 7A, and 7B, exemplary embodiments of the full-duplex CPA assembly 504 (e.g., shown as a single-band full-duplex CPA assembly 504A, which may be horizontally-arranged) are shown, according to the inventive concepts disclosed herein are depicted.

In some embodiments, the first CPA 505-1 and the second CPA 505-2 may be physically separated by a distance ("d"; e.g., a horizontal distance as shown in FIGS. 6, 7A, and 7B) so as to provide on-frequency isolation. In some embodiments, the first CPA 505-1 and the second CPA 505-2 may be positioned over an at least partially conductive surface 704 (as shown in FIGS. 7A-7B; e.g., an at least partially conductive aerodynamic surface, such as a metallic surface or a carbon fiber surface of a vehicle (e.g., an aircraft 102 (e.g., an UAS)) extending between the first CPA 505-1 and the second CPA 505-2.

As shown in FIGS. 7A-B, in some embodiments, the full-duplex CPA assembly 504A may include at least one of at least one HIS 702 or at least one HIS ground plane 802; for example, the at least one of the at least one HIS 702 or the at least one HIS ground plane 802 may be positioned between (a) the first and second CPAs and (b) the at least partially conductive surface 704.

Referring to FIG. 6, in some embodiments, for the full-duplex CPA assembly 504A with Ku band CPAs (e.g., 505-1, 505-2) (having an approximate CPA diameter of 1.2 inches) and lacking the duplexer 512, heuristically, 50 dB isolation may be achievable with a distance of d equal to about 21 inches (e.g., +/−3 inches), at a frequency of 14.5 GHz, assuming a simple free space path loss scenario. For example, the first and second CPAs 505-1, 505-2 may reside on an at least conductive carbon fiber surface exterior aerodynamic surface (e.g., 704) of a UAS. Better isolation estimates may be readily determinable via direct measurement or a straight forward electromagnetic (EM) simulation to determine Rx-to-Tx isolation as a function of antenna separation. The relatively narrow instantaneous bandwidth and filtration properties of the CPA may help in the overall system isolation and may help to reduce the required separation to less than 21 inches, for this example.

Referring to FIG. 6, in some embodiments, for the full-duplex CPA assembly 504A with Ku band CPAs (e.g., 505-1, 505-2) (having an approximate CPA diameter of 1.2 inches) and with a low order duplexer 512 (e.g., first, second, third, fourth, or fifth order duplexer), heuristically 50 dB isolation may be achievable with less than 21 inches of with a distance of d less than 21 inches, at a frequency of 14.5 GHz, assuming a simple free space path loss scenario. For example, the first and second CPAs 505-1, 505-2 may reside on an at least conductive carbon fiber surface exterior aerodynamic surface (e.g., 704) of a UAS. Better isolation estimates may be readily determinable via direct measurement or a straight forward electromagnetic (EM) simulation to determine Rx-to-Tx isolation as a function of antenna separation. The relatively narrow instantaneous bandwidth and filtration properties of the CPA may help in the overall system isolation and may help to reduce the required separation to much less than 21 inches, for this example.

Referring to FIGS. 7A and 7B, in some embodiments, the full-duplex CPA assembly 504A may include at least one HIS ground plane 702; for example, the at least one HIS surfaces 702 may be positioned between (a) the first and second CPAs 505-1, 505-2 and (b) the at least partially conductive surface 704. In FIG. 7A, the at least one HIS ground plane 702 is two localized HIS surfaces 702, where each HIS ground plane 702 may be positioned under and with a diameter longer than each diameter (e.g., approximately 1.2 inches for an example having Ku band CPAs) CPA 505-1 or 505-2. In FIG. 7B, the at least one HIS 702 may be a single contiguous HIS 702, where the single contiguous HIS 702 may be positioned under and an extending between the first and second CPAs 505-1 or 505-2 (e.g., which may have diameters of approximately 1.2 inches for an example having Ku band CPAs).

Referring still to FIGS. 7A and 7B, the at least HIS 702 surface between monopole-like antennas, such as the first and second Ku Band CPAs (e.g., 505-1, 505-2) can improve antenna isolation on the order of 30 dB for narrow band application, which may be appropriate for the CDL Data Link example without the duplexer 512 of FIG. 6 that implies that 50 dB isolation may achievable for significantly much less than 21 inches of physical separation (e.g., such as), at frequency of 14.5 GHz, for the examples shown in FIGS. 7A and 7B. Better isolation estimates may be readily determinable via straight-forward EM simulation, where the HIS 702 may be modeled as an ideal high impedance boundary condition to determine Rx-to-Tx isolation as a function of antenna separation, for this example. The relatively narrow instantaneous bandwidth and filtration properties of the CPAs (e.g., 505-1, 505-2) may help in the overall system isolation and may help to further reduce the required antenna separation. Additionally, a low order duplexer 512 (e.g., first, second, third, fourth, or fifth order duplexer) can also be used in conjunction with the HIS surface(s) 702, similar to that described with respect to the example described with reference to FIG. 6.

As shown in FIG. 7A, in some embodiments, the localized HIS s (e.g., 702) can be integrated directly into an assembly comprising the full-duplex CPA assembly 504A and/or a radome (e.g., 302)).

As shown in FIG. 7B, in some embodiments, the single contiguous HIS (e.g., 702) can be mounted atop the at least partially conductive surface 704 of a UAS, can be conformally mounted, for example, assuming the HIS (e.g., 702) features a robust environmental design.

Figure 8A:
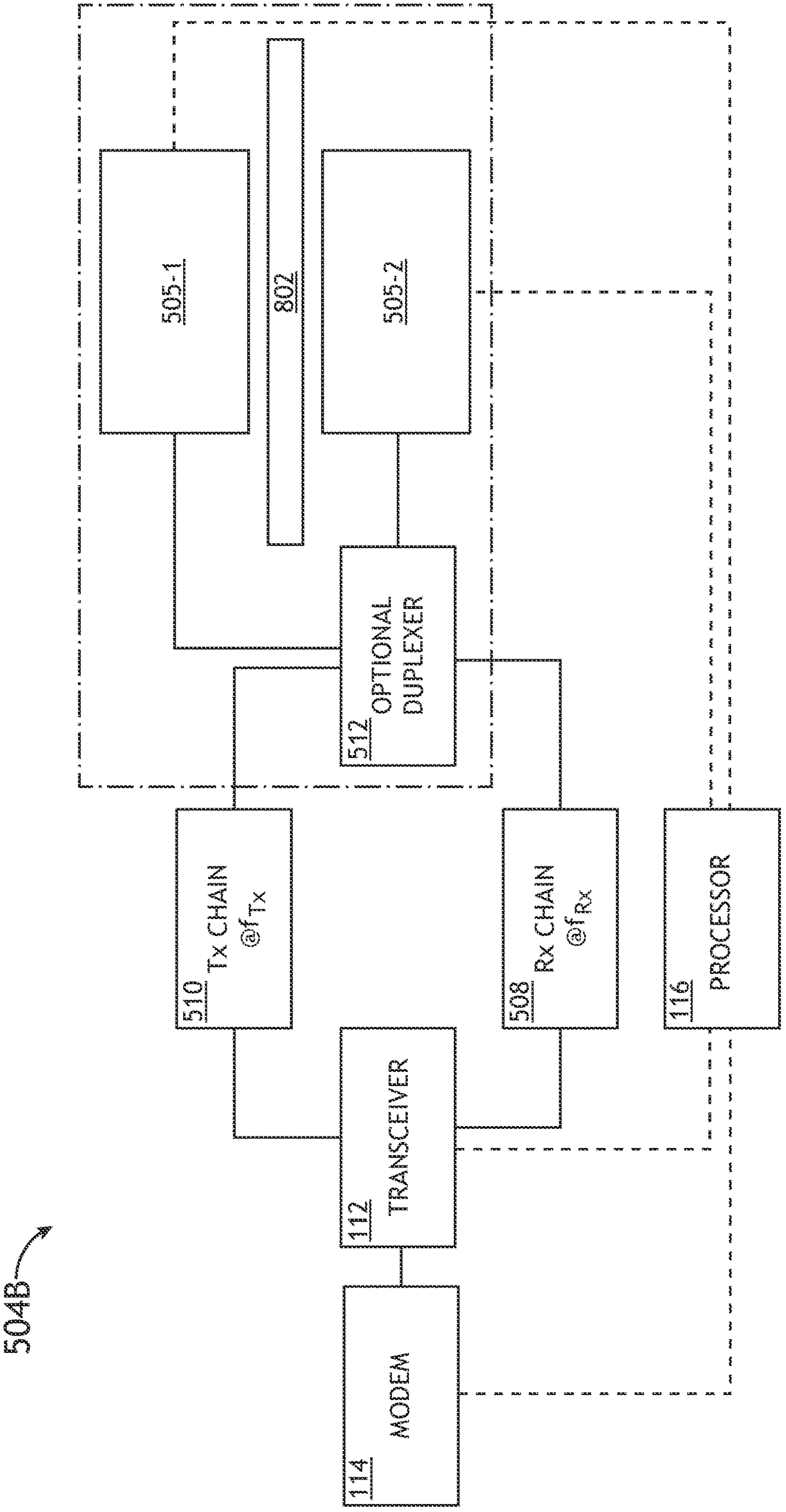
Figure 8B:
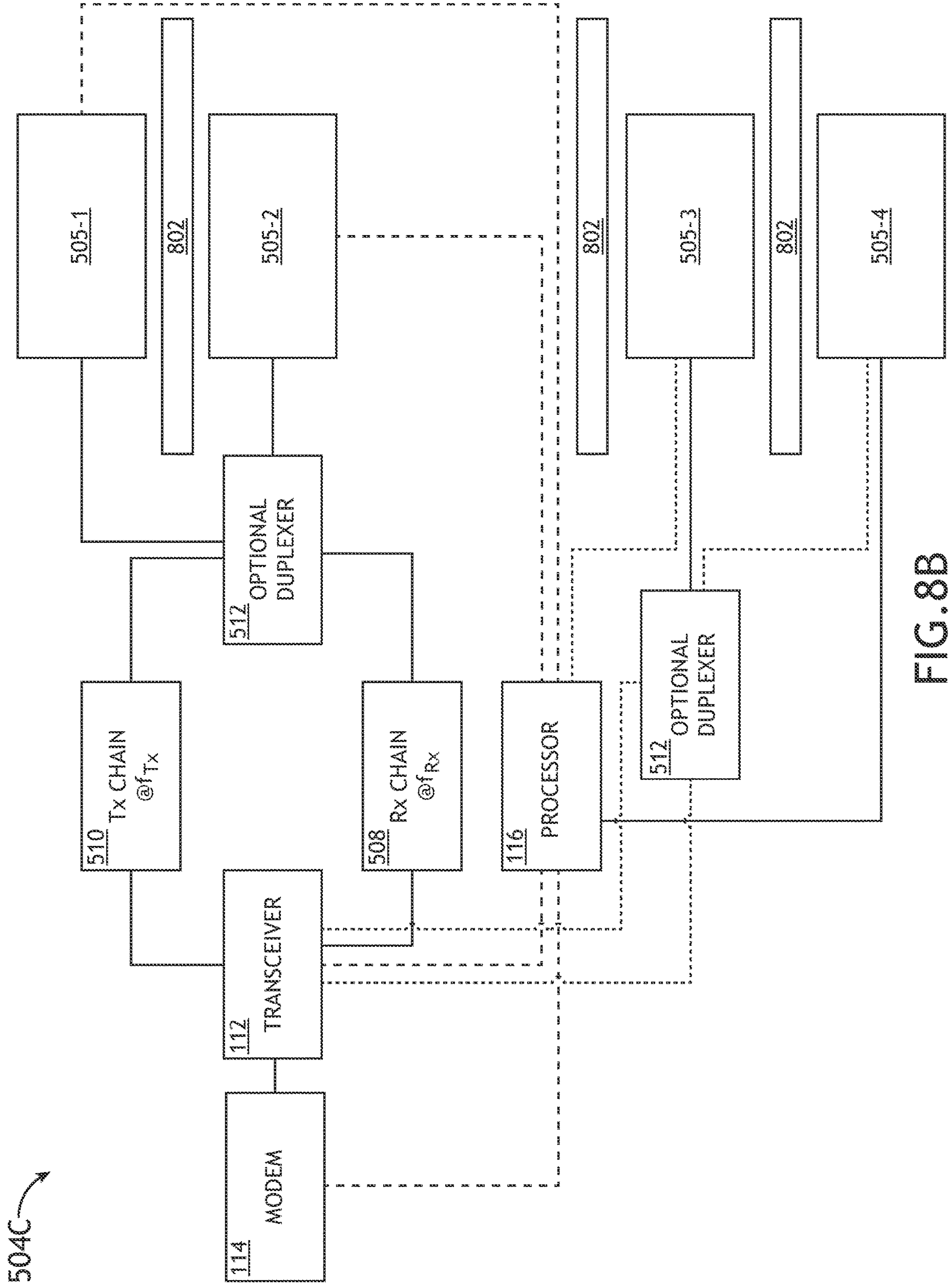

Referring to FIGS. 8A and 8B, exemplary embodiments of the full-duplex CPA assembly 504 (e.g., exemplarily shown as a single-band full-duplex stacked CPA assembly 504B as shown in FIG. 8A or a multiple band full-duplex stacked CPA assembly 504C (e.g., exemplarily shown as a dual-band full-duplex stacked CPA assembly) as shown in FIG. 8B) are shown, according to the inventive concepts disclosed herein are depicted. It should be noted that FIGS. 8A and 8B do not show control signal lines, for simplicity of illustration. In some embodiments, the single-band full-duplex stacked CPA assembly 504B or the multiple band full-duplex stacked CPA assembly 504C may include at least one Rx chain 508, at least one Tx chain 510, and/or at least one optional duplexer 512 (e.g., at least one low order duplexer), as described above. For example, the single-band full-duplex stacked CPA assembly 504B may include an Rx chain 508, a Tx chain 510, and/or an optional duplexer 512 (e.g., a low order duplexer). For example, the multiple band full-duplex stacked CPA assembly 504C may include at least one (e.g., two) Rx chain 508, at least one (e.g., two) Tx chain

510, and/or at least one (e.g., two) optional duplexer 512 (e.g., at least two low order duplexer).

In some embodiments, the full-duplex stacked CPA assembly 504B, 504C (e.g., the single-band full-duplex stacked CPA assembly 504B as shown in FIG. 8A or a multiple band full-duplex stacked CPA assembly 504C) may have the first CPA 505-1 positioned above the second CPA 505-2. The full-duplex stacked CPA assembly 504B, 504C may include a first CPA 505-1 configured to at least one of transmit or receive over a first bandwidth; and/or a second CPA 505-2 configured to at least one of transmit or receive over the first bandwidth. The first CPA 505-1 may be configured to one of transmit or receive over the first bandwidth while the second CPA 505-2 is configured to another of transmit or receive over the first bandwidth. The first CPA 505-1 and the second CPA 505-2 may be physically separated by a vertical distance so as to provide on-frequency isolation. The full-duplex stacked CPA 504B, 504C may further include a high impedance surface (HIS) 802 (e.g., a single-sided or double-sided HIS) positioned between the first CPA 505-1 and the second CPA 505-2. The HIS 802 may be configured to provide further on-frequency isolation.

As shown in FIG. 8B, in some embodiments, the multiple band full-duplex stacked CPA assembly 504C may further include: a third CPA 505-3 configured to at least one of transmit or receive over a second bandwidth; a fourth CPA 505-4 configured to at least one of transmit or receive over the second bandwidth; a second HIS 802 positioned between the second CPA 505-2 and the third CPA 505-3; and/or a third HIS 802 positioned between the third CPA 505-3 and the fourth CPA 505-4. The third CPA 505-3 may be configured to one of transmit or receive over the second bandwidth while the fourth CPA 505-4 is configured to another of transmit or receive over the second bandwidth. The second CPA 505-2 may be positioned above the third CPA 505-3. The third CPA 505-3 may be positioned above the fourth CPA 505-4. In some embodiments, at least one of the HIS 802, the second HIS 802, and the third HIS 802 is a double-sided HIS; for example, at least one double sided HIS 802 can be resonant at two different frequencies to optimize isolation across two bands. In some embodiments, at least one of the HIS 802, the second HIS 802, and the third HIS 802 is a single-sided HIS. For example, where the multiple band full-duplex stacked CPA assembly 504C is a dual band full-duplex stacked CPA assembly, the dual band full-duplex stacked CPA assembly may include a single transceiver 112 (e.g., a single broadband transceiver) configured to operate over two bands or two transceivers 112, each configured to operate over a single band. For example, where the multiple band full-duplex stacked CPA assembly 504C is a dual band full-duplex stacked CPA assembly, the dual band full-duplex stacked CPA assembly may include a single processor 116 configured to control communication operations over two bands or two processors 116, each configured to control communication operations over a single band.

In some embodiments, the multiple band full-duplex stacked CPA assembly 504C may have any number of stacked CPAs 505-1, 505-2, 505-3, 505-4, etc. and HISs 802 so as to achieve use of any suitable number of bands. For example, the multiple band full-duplex stacked CPA assembly 504C may be a triple band full-duplex stacked CPA assembly, which may further include: a fifth CPA (not shown) configured to at least one of transmit or receive over a third bandwidth; a sixth CPA (not shown) configured to at least one of transmit or receive over the third bandwidth; a fourth HIS 802 positioned between the fourth CPA (not shown) and the fifth CPA (not shown); and/or a fifth HIS 802 positioned between the fifth CPA (not shown) and the sixth CPA (not shown). The fifth CPA (not shown) may be configured to one of transmit or receive over the third bandwidth while the sixth CPA (not shown) is configured to another of transmit or receive over the third bandwidth. The fourth CPA (not shown) may be positioned above the fifth CPA (not shown). The fifth CPA may be positioned above the sixth CPA (not shown). For example, where the multiple band full-duplex stacked CPA assembly 504C is a triple band full-duplex stacked CPA assembly, the dual triple band full-duplex stacked CPA assembly may include a single transceiver 112 (e.g., a single broadband transceiver) configured to operate over three bands or three transceivers 112, each configured to operate over a single band. For example, where the multiple band full-duplex stacked CPA assembly 504C is a triple band full-duplex stacked CPA assembly, the triple band full-duplex stacked CPA assembly may include a single processor 116 configured to control communication operations over three bands or three processors 116, each configured to control communication operations over a single band.

Referring again to FIGS. 8A and 8B, in some embodiments, each of the CPAs 505-1, 505-2, 505-3, 505-4, and/or etc. may be configured to transmit over any suitable bandwidth, such as at least one of a C band, a Ku band, or a Ka band. For example, lower frequency CPAs (e.g., 505-1 and 505-2, or 505-3 and 505-4) may be intentionally designed to cut-off and/or block higher frequencies.

Referring again to FIGS. 8A and 8B, in some embodiments, the one or more HIS(s) 802 of the single-band full-duplex stacked CPA assembly 504B and the multiple band full-duplex stacked CPA assembly 504C may provide additional Rx-to-Tx on frequency isolation.

Referring again to FIGS. 8A and 8B, in some embodiments, the full-duplex stacked CPA assembly 504B, 504C may include dual-linear and/or circularly-polarized CPAs (e.g., 505-1, 505-2, 505-3, and/or 505-4), either by design or by an added wrap-around polarizer to provide additional isolation between Rx and Tx. In some embodiments, the full-duplex stacked CPA assembly 504B, 504C may include intermediate frequency (IF) filters (e.g., miniature high Q RF filters, such as Z-fab filters). In some embodiments, the Rx CPA(s) (e.g., 505-1, 505-2, 505-3, and/or 505-4) can be configured to form nulls in the Rx CPA(s)' radiation pattern(s) for off-axis jammer immunity.

Referring again to FIGS. 8A and 8B, in some embodiments, the full-duplex stacked CPA assembly 504B, 504C may result in an extremely small full-duplex dual omnidirectional and/or directional mode antenna architecture suitable for SWaP-C installations (e.g., on an UAS). In some embodiments, the full-duplex stacked CPA assembly 504C may result in an extremely small multi-band full-duplex dual omnidirectional or directional mode antenna architecture suitable for SWaP-C installations (e.g., on an UAS).

Referring again to FIGS. 8A and 8B, in some embodiments, the full-duplex stacked CPA assembly 504B, 504C can be electronically reconfigured (e.g., reprogrammed, such as where the processor 116 is an FPGA) to a half-duplex elevation beam-steered collinear array, if desired. For example, such collinear array concept may apply to any CPAs in the stack that operate at a same frequency; for example, FIG. 8B could be modified to be a repeat-stacked (e.g., twice stacked of what is shown in FIG. 8B) so as to achieve a two-element collinear array, each of a different frequency band.

Referring again to FIG. 8B, different frequency Rx and Tx CPAs (e.g., 505-1, 505-2, 505-3, and/or 505-4) can be interlaced (e.g., an arrangement of $f_1$ Tx, $f_2$ Tx, $f_1$ Rx, and $f_2$ Rx in the stack in such a way as to maximize the distance between the Tx and Rx functions of a given frequency band to maximize isolation; e.g., for greater "in band" isolation, if needed).

Figure 9B:
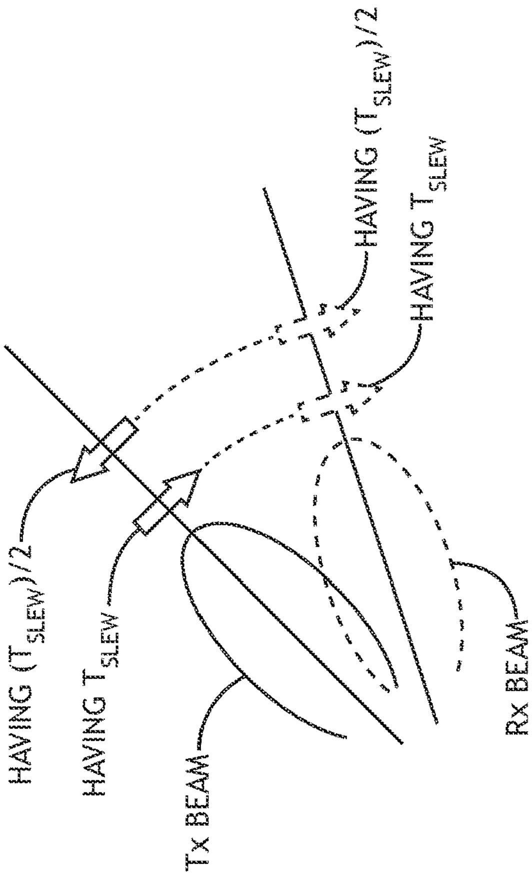
FIGS. 9A and 9B are exemplary graphs of radiation patterns associated with exemplary embodiments of the circular parasitic array assembly of the system of FIG. 5 according to the inventive concepts disclosed herein.
Figure 9A:
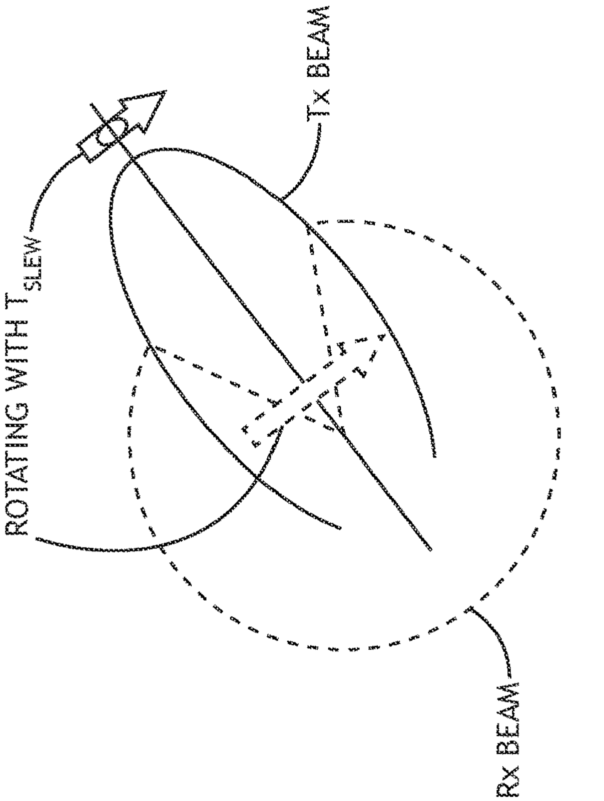

Referring to FIGS. 9A and 9B, exemplary graphs of radiation patterns associated with some embodiments of the CPA assembly 504 are shown, according to the inventive concepts disclosed herein are depicted. In some embodiments, if the CPA assembly 504 is full-duplex, the CPA assembly 504 can have different theta and/or phi beam locations. For example, the CPA assembly can optionally use radiation pattern synthesis and/or nulling of a Tx beam from a Rx beam and/or can optionally use time such that the Rx is first at one point during a transmit/receive period (T) and Tx is offset by a delay within the period. In some embodiments, the Rx CPA(s) (e.g., 505-1, 505-2, 505-3, and/or 505-4) can be configured to form nulls in the Rx CPA(s)' radiation pattern(s) for off-axis jammer immunity.

In some embodiments, the CPA assembly 504 can be configured to form nulls in the radiation pattern (e.g., at least one transmit pattern and at least one receive pattern)—which, for example, can be used for further full-duplex isolation for classes of continuous waveforms that tolerate latency between Tx and Rx—when synchronized against an a priori known beam slew rate.

In some embodiments, the Rx beam may be nulled and an omnidirectional null may track the Tx directional beam to increase Tx-to-Rx isolation. For example, there may be a time delay of $T_{slew}$ between the Tx and Rx beams scanning in a same direction. For example, the omnidirectional Rx pattern can listen to all angles at all times, including the same Tx time instant, everywhere except in the null.

In some embodiments, the full-duplex CPA assembly 504 may be configured to form at least one null in a radiation pattern of the full-duplex CPA assembly, and the full-duplex CPA assembly 504 may be configured to use the at least one null to further provide full-duplex isolation for classes of continuous waveforms that tolerate latency between transmit and receive. In some embodiments, the radiation pattern includes an omnidirectional receive beam and an omni directional transmit beam, wherein each of the omnidirectional receive beam and the omnidirectional transmit beam has a at least one null, wherein one or more of the at least null of the omnidirectional receive beam tracks the omnidirectional transmit beam to achieve the further full-duplex isolation. In some embodiments, the radiation pattern includes an omnidirectional receive beam and a directional transmit beam, wherein the omnidirectional receive beam has the at least one null, wherein one or more of the at least null of the omnidirectional receive beam tracks the directional transmit beam to achieve the further full-duplex isolation. In some embodiments, the radiation pattern includes a directional receive beam and a directional transmit beam, wherein the full-duplex CPA assembly 504 is further configured to synchronously sweep the directional receive beam and the directional transmit beam in a same direction with a time delay between the directional receive beam and the directional transmit beam. For example, the directional Rx and directional Tx beams can be synchronously swept in the same direction for a time delay of $T_{slew}$ between the Tx and Rx beams. In some embodiments, the radiation pattern includes a directional receive beam and a directional transmit beam, wherein the full-duplex CPA assembly 504 is further configured to synchronously sweep the directional receive beam and the directional transmit beam in opposite directions with a time delay between the directional receive beam and the directional transmit beam. For example, the directional Rx and directional Tx beams can sweep synchronously in opposite directions for a time delay of $(T_{slew})/2$ between the Tx and Rx beams.

Referring generally to FIGS. 5-9B, some embodiments may include a CPA assembly 504 (e.g., 504A, 504B, or 504C) including: a first CPA 505-1 configured to at least one of transmit or receive; and a second CPA 505-1 configured to at least one of transmit or receive; wherein the first CPA 505-1 is configured to one of transmit or receive over a first bandwidth while the second CPA 505-2 is configured to another of transmit or receive over the first bandwidth or a second bandwidth, wherein the first CPA 505-1 and the second CPA 505-2 are physically separated by a distance so as to provide on-frequency isolation.

In some embodiments, the CPA assembly 504 may be a half-duplex, full-duplex, or mixed half-duplex and full-duplex CPA assembly. For example, the CPA assembly 504 may be a full-duplex CPA assembly, and the first CPA 505-1 may be configured to one of transmit or receive over the first bandwidth while the second CPA 505-2 is configured to another of transmit or receive over the first bandwidth.

In some embodiments, the CPA assembly 504 may be a multiple-mode CPA assembly configured to operate in a half-duplex mode and/or a full-duplex mode at a given time. For example, the multiple-mode CPA assembly may be a dual-mode CPA assembly configured to operate in a half-duplex mode or a full-duplex mode at a given time; in some embodiments, the multiple-mode CPA assembly may be a triple-mode CPA assembly configured to operate in a half-duplex mode, a full-duplex mode, or a hybrid half-duplex (e.g., for at least one bandwidth) and full-duplex mode (e.g., for at least one other bandwidth) at a given time.

In some embodiments, the CPA assembly 504 may be a full-duplex CPA assembly, wherein the first CPA 505-1 is configured to one of transmit or receive over a first frequency within the first bandwidth while the second CPA 505-2 is configured to another of transmit or receive over a second frequency within the first bandwidth.

In some embodiments, the CPA assembly 504 is a full-duplex CPA assembly, wherein the full-duplex CPA assembly is a single-band full-duplex CPA assembly (e.g., 504A), wherein the distance is a horizontal distance between the first CPA 505-1 and the second CPA 505-2, wherein the first CPA 505-1 and the second CPA 505-2 are positioned over an at least partially conductive surface 704 extending between the first CPA 505-1 and the second CPA 505-2. In some embodiments, the full-duplex CPA assembly includes at least one high impedance surface (HIS) 702, each of the at least one high impedance surface (HIS) 702 positioned between (a) one or more of the first and second CPAs 505-1, 505-2 and (b) the at least partially conductive surface 704. In some embodiments, an unmanned aerial system (UAS) may include the at least partially conductive surface 704, wherein the at least partially conductive surface 704 is an at least partially conductive aerodynamic surface of the UAS.

In some embodiments, the CPA assembly 504 is a stacked CPA assembly (e.g., 504B or 504C), wherein the first CPA 505-1 is positioned above the second CPA 505-2, wherein the distance is a vertical distance, wherein the stacked CPA assembly further comprises a high impedance surface (HIS) 802 positioned between the first CPA 505-1 and the second CPA 505-2, wherein the HIS 802 is configured to provide further on-frequency isolation. In some embodiments, the HIS 802 is a double-sided HIS.

In some embodiments, the stacked CPA assembly may be a multiple band stacked CPA assembly (e.g., 504C), wherein the stacked CPA further includes: a third CPA 505-3 configured to at least one of transmit or receive; a fourth CPA 505-4 configured to at least one of transmit or receive; a second HIS 802 positioned between the second CPA 505-2 and the third CPA 505-3; and a third HIS 802 positioned between the third CPA 505-3 and the fourth CPA 505-4; wherein the third CPA 505-3 is configured to one of transmit or receive over the first bandwidth, the second bandwidth, or a third bandwidth while the fourth CPA 505-4 is configured to another of transmit or receive over the first bandwidth, the second bandwidth, the third bandwidth, or a fourth bandwidth; wherein the second CPA 505-2 is positioned above the third CPA 505-3; wherein the third CPA 505-3 is positioned above the fourth CPA 505-4. In some embodiments, the third CPA 505-3 is configured to one of transmit or receive over the third bandwidth while the fourth CPA 505-4 is configured to another of transmit or receive over the third bandwidth; in some embodiments, the stacked CPA assembly is a multiple band full-duplex stacked CPA assembly, wherein the first CPA 505-1 is configured to one of transmit or receive over the first bandwidth while the second CPA 505-2 is configured to another of transmit or receive over the first bandwidth. In some embodiments, the stacked CPA assembly further includes: a fifth CPA configured to at least one of transmit or receive; a sixth CPA configured to at least one of transmit or receive; a fourth HIS 802 positioned between the fourth CPA 505-4 and the fifth CPA; and a fifth HIS 802 positioned between the fifth CPA and the sixth CPA; wherein the fifth CPA is configured to one of transmit or receive over the first bandwidth, the second bandwidth, the third bandwidth, the fourth bandwidth, or a fifth bandwidth while the sixth CPA is configured to another of transmit or receive over the first bandwidth, the second bandwidth, the third bandwidth, the fourth bandwidth, the fifth bandwidth, or a sixth bandwidth; wherein the fourth CPA 505-4 is positioned above the fifth CPA; wherein the fifth CPA is positioned above the sixth CPA.

In some embodiments, each of the first bandwidth, the second bandwidth, the third bandwidth, the fourth bandwidth, the fifth bandwidth, and/or the sixth bandwidth is in one of the Ku, Ka, or C bands. In some embodiments, wherein the first bandwidth, the second bandwidth, the third bandwidth, the fourth bandwidth, the fifth bandwidth, and/or the sixth bandwidth is in the Ku band, wherein the full-duplex CPA assembly is configured to use a Ku Band Common Data Link (CDL) protocol.

In some embodiments, the CPA assembly 504 further includes at least one low order duplexer.

As will be appreciated from the above, embodiments of the inventive concepts disclosed herein may be directed to a method and a system including a circular parasitic array (CPA) assembly (e.g., a half-duplex or full-duplex CPA assembly, such as a single-band or multiple band full-duplex CPA assembly).

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:

a circular parasitic array (CPA) assembly, comprising:

a first CPA configured to at least one of transmit or receive; and a second CPA configured to at least one of transmit or receive;

wherein the first CPA is configured to one of transmit or receive over a first bandwidth while the second CPA is configured to another of transmit or receive over the first bandwidth or a second bandwidth;

wherein the first CPA and the second CPA are physically separated by a horizontal distance so as to provide on-frequency isolation, wherein the CPA assembly is a full-duplex CPA assembly, wherein the full-duplex CPA assembly is a single-band full-duplex CPA assembly, wherein the first CPA and the second CPA are positioned over an at least partially conductive surface extending between the first CPA and the second CPA.

2. The system of claim 1, wherein the CPA assembly is a full-duplex CPA assembly, wherein the first CPA is configured to one of transmit or receive over the first bandwidth while the second CPA is configured to another of transmit or receive over the first bandwidth.

3. The system of claim 1, wherein the CPA assembly is a multiple-mode CPA assembly configured to operate in a half-duplex mode and/or a full-duplex mode at a given time.

4. The system of claim 1, wherein the CPA assembly is a full-duplex CPA assembly, wherein the first CPA is configured to one of transmit or receive over a first frequency within the first bandwidth while the second CPA is configured to another of transmit or receive over a second frequency within the first bandwidth.

5. The system of claim 1, wherein the full-duplex CPA assembly further comprises at least one high impedance surface (HIS), each of the at least one high impedance surface (HIS) positioned between (a) one or more of the first and second CPAs and (b) the at least partially conductive surface.

6. The system of claim 5, further comprising an unmanned aerial system (UAS) comprising the at least partially conductive surface, wherein the at least partially conductive surface is an at least partially conductive aerodynamic surface of the UAS.

7. The system of claim 1, wherein the CPA assembly is a stacked CPA assembly, wherein the first CPA is positioned above the second CPA, wherein the distance is a vertical distance, wherein the stacked CPA assembly further comprises a high impedance surface (HIS) positioned between the first CPA and the second CPA, wherein the HIS is configured to provide further on-frequency isolation.

8. The system of claim 7, wherein the HIS is a double-sided HIS.

9. The system of claim 7, wherein the stacked CPA assembly is a multiple band stacked CPA assembly, wherein the stacked CPA further comprises: a third CPA configured to at least one of transmit or receive; a fourth CPA configured to at least one of transmit or receive; a second HIS positioned between the second CPA and the third CPA; and a third HIS positioned between the third CPA and the fourth CPA; wherein the third CPA is configured to one of transmit or receive over the first bandwidth, the second bandwidth, or a third bandwidth while the fourth CPA is configured to another of transmit or receive over the first bandwidth, the second bandwidth, the third bandwidth, or a fourth bandwidth; wherein the second CPA is positioned above the third CPA; wherein the third CPA is positioned above the fourth CPA.

10. The system of claim 9, wherein the third CPA is configured to one of transmit or receive over the third bandwidth while the fourth CPA is configured to another of transmit or receive over the third bandwidth.

11. The system of claim 10, wherein the stacked CPA assembly is a multiple band full-duplex stacked CPA assembly, wherein the first CPA is configured to one of transmit or receive over the first bandwidth while the second CPA is configured to another of transmit or receive over the first bandwidth.

12. The system of claim 9, wherein the stacked CPA assembly further comprises: a fifth CPA configured to at least one of transmit or receive; a sixth CPA configured to at least one of transmit or receive; a fourth HIS positioned between the fourth CPA and the fifth CPA; and a fifth HIS positioned between the fifth CPA and the sixth CPA; wherein the fifth CPA is configured to one of transmit or receive over the first bandwidth, the second bandwidth, the third bandwidth, the fourth bandwidth, or a fifth bandwidth while the sixth CPA is configured to another of transmit or receive over the first bandwidth, the second bandwidth, the third bandwidth, the fourth bandwidth, the fifth bandwidth, or a sixth bandwidth; wherein the fourth CPA is positioned above the fifth CPA; wherein the fifth CPA is positioned above the sixth CPA.

13. The system of claim 1, wherein the first bandwidth is in one of the Ku, Ka, or C bands.

14. The system of claim 13, wherein the first bandwidth is in the Ku band, wherein the full-duplex CPA assembly is configured to use a Ku Band Common Data Link (CDL) protocol.

15. The system of claim 1, wherein the CPA assembly is a full-duplex CPA assembly, wherein the full-duplex CPA assembly is configured to form at least one null in a radiation pattern of the full-duplex CPA assembly, wherein the full-duplex CPA assembly is configured to use the at least one null to further provide full-duplex isolation for classes of continuous waveforms that tolerate latency between transmit and receive.

16. The system of claim 15, wherein the radiation pattern includes an omnidirectional receive beam and a directional transmit beam, wherein the omnidirectional receive beam has the at least one null, wherein one or more of the at least null of the omnidirectional receive beam tracks the directional transmit beam to achieve the further full-duplex isolation.

17. The system of claim 15, wherein the radiation pattern includes a directional receive beam and a directional transmit beam, wherein the full-duplex CPA assembly is further configured to synchronously sweep the directional receive beam and the directional transmit beam in a same direction with a time delay between the directional receive beam and the directional transmit beam.

18. The system of claim 15, wherein the radiation pattern includes a directional receive beam and a directional transmit beam, wherein the full-duplex CPA assembly is further configured to synchronously sweep the directional receive beam and the directional transmit beam in opposite directions with a time delay between the directional receive beam and the directional transmit beam.

19. A system, comprising:

a full duplex circular parasitic array (CPA) assembly, comprising:

a first CPA configured to at least one of transmit or receive; and a second CPA configured to at least one of transmit or receive;

wherein the first CPA is configured to one of transmit or receive over a first bandwidth while the second CPA is configured to another of transmit or receive over the first bandwidth or a second bandwidth;

wherein the first CPA and the second CPA are physically separated by a distance so as to provide on-frequency isolation, wherein the full-duplex CPA assembly is configured to form at least one null in a radiation pattern of the full-duplex CPA assembly, wherein the full-duplex CPA assembly is configured to use the at least one null to further provide full-duplex isolation for classes of continuous waveforms that tolerate latency between transmit and receive, wherein the radiation pattern includes a directional receive beam and a directional transmit beam, wherein the full-duplex CPA assembly is further configured to synchronously sweep the directional receive beam and the directional transmit beam in a same direction with a time delay between the directional receive beam and the directional transmit beam.

20. A system, comprising:

a full duplex circular parasitic array (CPA) assembly, comprising:

a first CPA configured to at least one of transmit or receive; and a second CPA configured to at least one of transmit or receive;

wherein the first CPA is configured to one of transmit or receive over a first bandwidth while the second CPA is configured to another of transmit or receive over the first bandwidth or a second bandwidth;

wherein the first CPA and the second CPA are physically separated by a distance so as to provide on-frequency isolation, wherein the full-duplex CPA assembly is configured to form at least one null in a radiation pattern of the full-duplex CPA assembly, wherein the full-duplex CPA assembly is configured to use the at least one null to further provide full-duplex isolation for classes of continuous waveforms that tolerate latency between transmit and receive, wherein the radiation pattern includes a directional receive beam and a directional transmit beam, wherein the full-duplex CPA assembly is further configured to synchronously sweep the directional receive beam and the directional transmit beam in opposite directions with a time delay between the directional receive beam and the directional transmit beam.

* * * * *